US006772085B2

(12) United States Patent
Watkins et al.

(10) Patent No.: US 6,772,085 B2
(45) Date of Patent: Aug. 3, 2004

(54) DEVICE FOR SELF-VERIFYING TEMPERATURE MEASUREMENT AND CONTROL

(75) Inventors: Arthur D. Watkins, Idaho Falls, ID (US); Collins P. Cannon, Kearney, MO (US); Charles R. Tolle, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 36 days.

(21) Appl. No.: 10/242,937

(22) Filed: Sep. 13, 2002

(65) Prior Publication Data

US 2003/0028345 A1 Feb. 6, 2003

Related U.S. Application Data

(62) Division of application No. 09/467,750, filed on Dec. 20, 1999, now Pat. No. 6,473,708.

(51) Int. Cl.$^7$ .......................... G01K 11/30; G01K 7/06; G06F 15/00; H05B 1/02
(52) U.S. Cl. .......................... 702/130; 73/713; 219/497; 219/667; 374/57; 374/131; 374/161; 374/179; 706/3
(58) Field of Search ................................ 374/131, 161, 374/162, 178–185, 1, 57, 121, 126; 702/99, 130, 131, 132, 136; 73/713; 219/497, 667, 494, 499, 501, 502; 600/353; 118/715, 725

(56) References Cited

U.S. PATENT DOCUMENTS

| | | | |
|---|---|---|---|
| 2,098,650 A | 11/1937 | Stein | 73/32 |
| 2,460,773 A | 2/1949 | Stimson | 171/777 |
| 2,769,340 A | 11/1956 | Bernreuter et al. | 73/361 |
| 3,307,402 A | 3/1967 | Richardson | 73/361 |
| 3,567,895 A | 3/1971 | Paz | 219/667 |
| 3,657,926 A | 4/1972 | Munson et al. | 73/713 |

(List continued on next page.)

FOREIGN PATENT DOCUMENTS

| | | |
|---|---|---|
| DE | SU-575-704 | 11/1977 |
| EP | 0 067 033 A1 | 12/1982 |

(List continued on next page.)

OTHER PUBLICATIONS

"Checking Resistance Thermometers Under Working Conditions Without Demounting", E.A. Bardyla; Measurement Techniques, vol. 27, No. 6, Jun. 1984, New York, US, pp. 524–526, XP002045741.

(List continued on next page.)

*Primary Examiner*—John Barlow
*Assistant Examiner*—John Le
(74) *Attorney, Agent, or Firm*—Wells St. John Roberts Gregory & Matkin

(57) ABSTRACT

A measuring instrument includes a first temperature sensor, a second temperature sensor and circuitry. The first and second temperature sensors each generate a signal indicative of the temperature of a medium being detected. The circuitry is configured to activate verification of temperature being sensed with the first sensor. According to one construction, the first temperature sensor comprises at least one thermocouple temperature sensor and the second temperature sensor comprises an optical temperature sensor, each sensor measuring temperature over the same range of temperature, but using a different physical phenomena. Also according to one construction, the circuitry comprises a computer configured to detect failure of one of the thermocouples by comparing temperature of the optical temperature sensor with each of the thermocouple temperature sensors. Even further, an output control signal is generated via a fuzzy inference machine and control apparatus.

1 Claim, 16 Drawing Sheets

U.S. PATENT DOCUMENTS

| | | | |
|---|---|---|---|
| 3,966,500 A | 6/1976 | Brixy | 136/232 |
| 4,133,700 A | 1/1979 | Hollander et al. | 73/361 |
| 4,215,576 A | 8/1980 | Quick et al. | 374/161 |
| 4,220,039 A | 9/1980 | Taylor | 73/15 R |
| 4,403,296 A | 9/1983 | Prosky | 364/573 |
| 4,624,582 A | 11/1986 | Banda et al. | 374/181 |
| 4,795,884 A | 1/1989 | Carroll | 219/497 |
| 4,854,727 A * | 8/1989 | Pecot et al. | 374/57 |
| 4,901,061 A | 2/1990 | Twerdochlib | 340/604 |
| 4,934,137 A | 6/1990 | MacKay | 60/39.33 |
| 4,971,452 A | 11/1990 | Finney | 374/208 |
| 4,977,001 A | 12/1990 | Greenspan | 428/34.6 |
| 5,022,263 A | 6/1991 | Uriu et al. | 73/295 |
| 5,036,704 A | 8/1991 | Pusatcioglu et al. | 73/336.5 |
| 5,038,303 A | 8/1991 | Kimura | 364/557 |
| 5,061,083 A | 10/1991 | Grimm et al. | 374/112 |
| 5,069,553 A | 12/1991 | Phillippi | 374/140 |
| 5,073,758 A | 12/1991 | Postlewait et al. | 324/713 |
| 5,089,749 A | 2/1992 | Cadogan | 315/151 |
| 5,112,137 A | 5/1992 | Wickersheim et al. | 374/131 |
| 5,116,137 A | 5/1992 | Xiong et al. | 374/132 |
| 5,121,994 A | 6/1992 | Molitoris | 374/179 |
| 5,173,224 A | 12/1992 | Nakamura et al. | 264/40.6 |
| 5,176,451 A | 1/1993 | Sasada et al. | 374/179 |
| 5,183,338 A | 2/1993 | Wickersheim et al. | 374/131 |
| 5,209,571 A | 5/1993 | Kendall | 374/139 |
| 5,232,286 A | 8/1993 | Dubreuil et al. | 374/139 |
| 5,246,293 A | 9/1993 | Luotsinen et al. | 374/181 |
| 5,275,327 A | 1/1994 | Watkins et al. | 228/102 |
| 5,277,496 A | 1/1994 | Mayer et al. | 374/179 |
| 5,351,551 A | 10/1994 | Drubetsky et al. | 73/755 |
| 5,356,220 A | 10/1994 | Iida et al. | 374/161 |
| 5,366,290 A | 11/1994 | Mayer et al. | 374/130 |
| 5,377,126 A | 12/1994 | Flik et al. | 364/557 |
| 5,596,988 A | 1/1997 | Markle et al. | 600/353 |
| 5,683,605 A * | 11/1997 | Matsuoka | 219/497 |
| 5,713,668 A | 2/1998 | Lunghofer et al. | 374/179 |
| 5,822,740 A * | 10/1998 | Haissig et al. | 706/3 |
| 6,473,708 B1 * | 10/2002 | Watkins et al. | 702/130 |

FOREIGN PATENT DOCUMENTS

| | | |
|---|---|---|
| EP | 0 775 897 A1 | 5/1997 |
| GB | PCT WO 93/21505 | 10/1993 |
| GB | PCT WO 95/01657 | 1/1995 |
| JP | 0122141 | 9/1979 |

OTHER PUBLICATIONS

"Dual high temperature measurements using Johnson noise thermometry", C.P. Cannon, et al.; *Am. Inst.* of Physics, 1982, pp. 1245–1248.

"Temperature measurements", C.P. Cannon, et al.; 1982 American Institute of Physics, pp. 1061–1066.

"Smart Sensor Appln. to Nuclear Plant Termocouple Channels", C. Cannon, et al.; speech given at Am. Nuclear Soc. Topical Mtg on Arificial Intelligence and Other Innovative Comput.Applns. Nuclear Ind., Aug. 31–Sep. 2, 1987.

"Lockheed Idaho Techniques Company Invention Disclosure Record", A.D. Watkins, C.P. Cannon and A.M. Porter, 6 pages (date of disclosure unknown).

"Development of a Smart Temperature Measurement System Based on the Multi–Lead Thermocouple Concept", Natour, Majed Nasr, published May 1990.

* cited by examiner

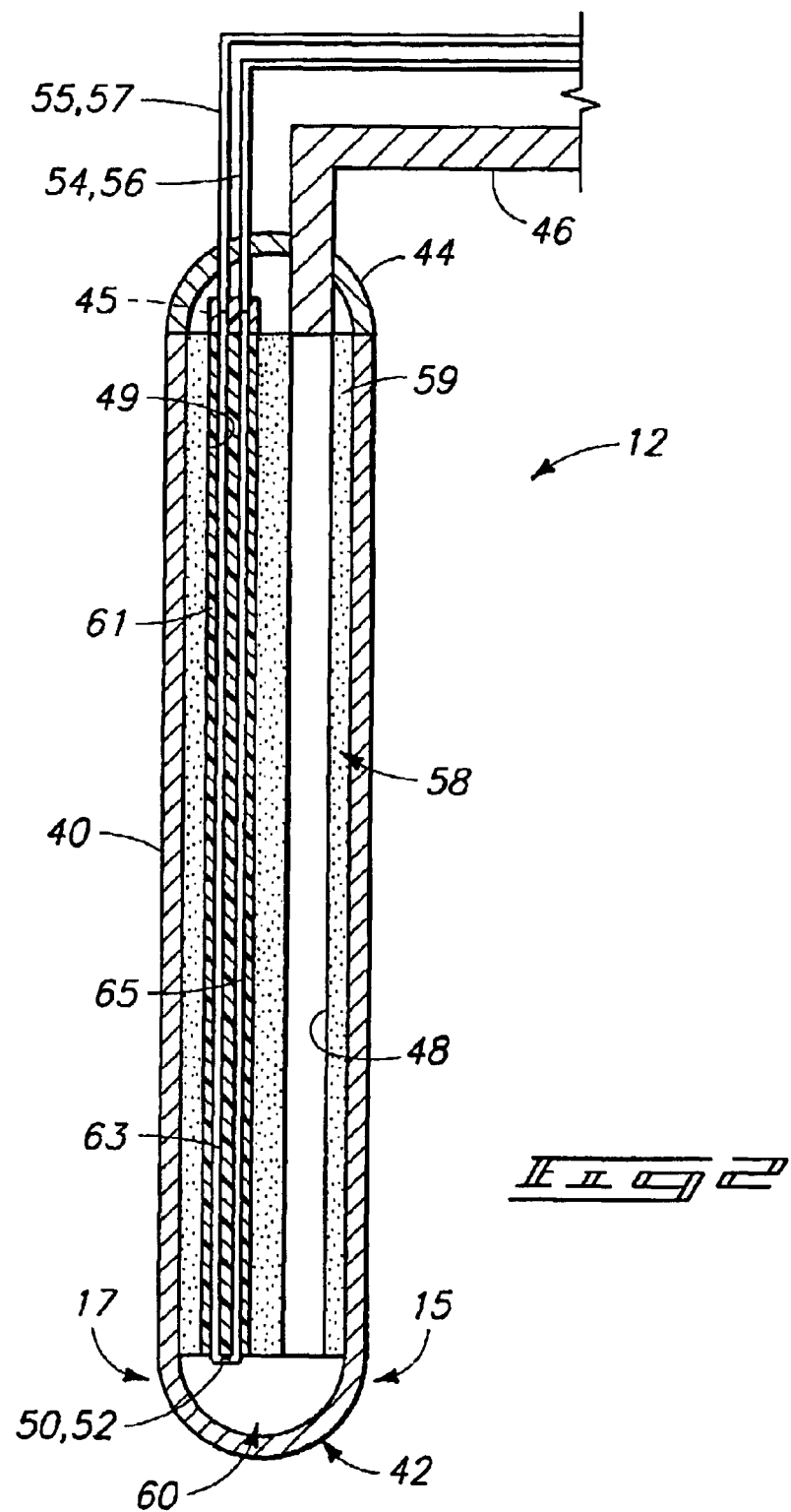

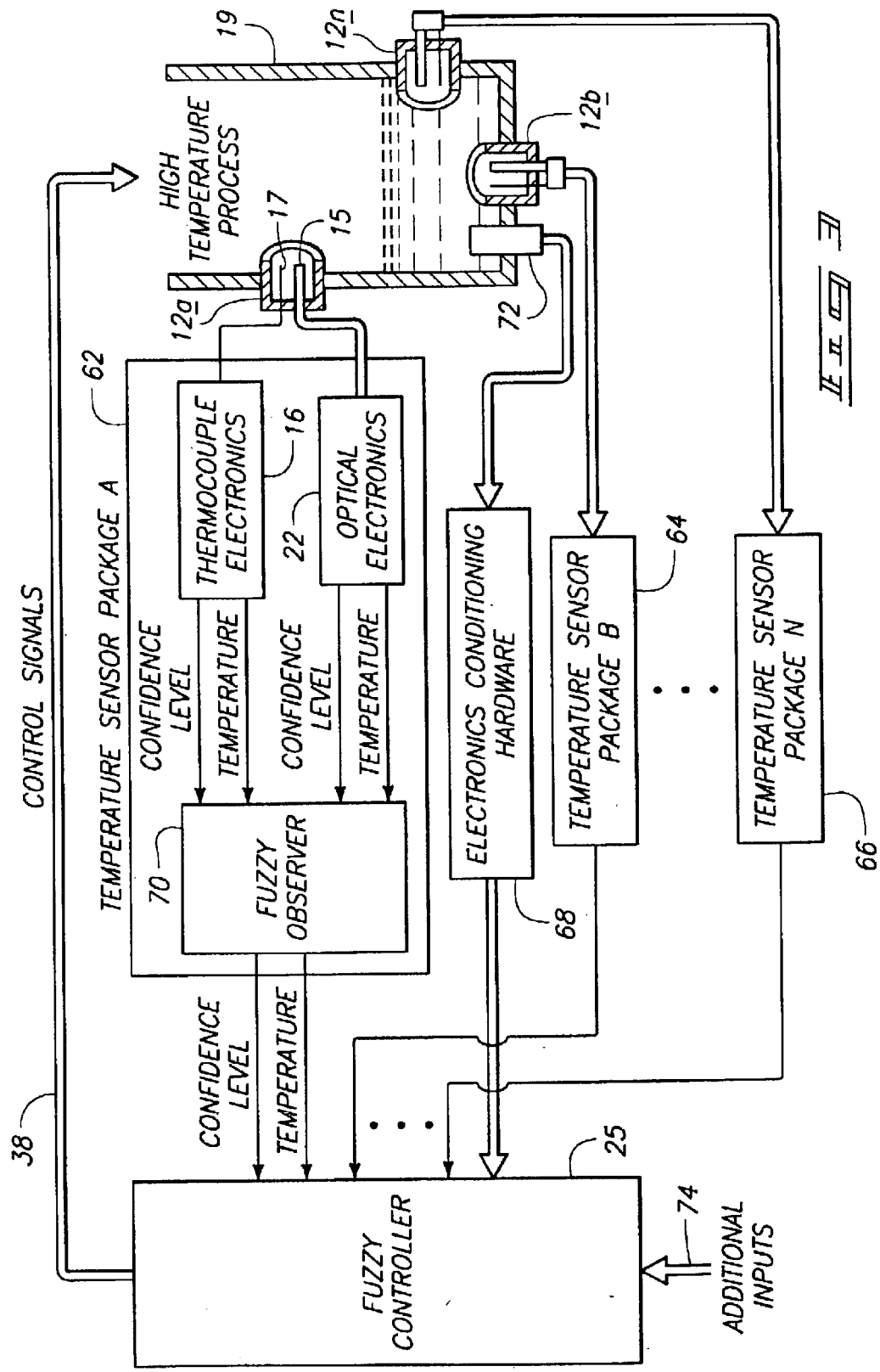

| $R_C(\#1,\#2)$ | $c_L$ LOW | $c_M$ MEDIUM | $c_H$ HIGH |
|---|---|---|---|
| $c_L$ LOW | $c_L$ LOW | $c_L$ LOW | $c_M$ MEDIUM |
| $c_M$ MEDIUM | $c_L$ LOW | $c_L$ LOW | $c_M$ MEDIUM |
| $c_H$ HIGH | $c_M$ MEDIUM | $c_M$ MEDIUM | $c_H$ HIGH |

SENSOR #1 CONFIDENCE (columns); SENSOR #2 CONFIDENCE (rows)

SENSOR #1

$R_H(T_{E_1}, T_{E_2}, C_1, C_2)$

| | | $E_N$ | $E_N$ | $E_Z$ | $E_Z$ | $E_P$ | $E_P$ | $T_{E_1}$ |
|---|---|---|---|---|---|---|---|---|
| | | $C_L$ | $C_H$ | $C_L$ | $C_H$ | $C_L$ | $C_H$ | $C_1$ |
| $E_N$ | $C_L$ | $H_Z$ | $H_{AM}$ | $H_Z$ | $H_Z$ | $H_Z$ | $H_{NM}$ | |
| $E_N$ | $C_H$ | $H_{AM}$ | $H_{AL}$ | $H_{AM}$ | $H_{AM}$ | $H_Z$ | $H_Z$ | |
| $E_Z$ | $C_L$ | $H_Z$ | $H_{AM}$ | $H_Z$ | $H_Z$ | $H_Z$ | $H_{NM}$ | |
| $E_Z$ | $C_H$ | $H_Z$ | $H_{AM}$ | $H_Z$ | $H_Z$ | $H_Z$ | $H_{NM}$ | |
| $E_P$ | $C_L$ | $H_Z$ | $H_{AM}$ | $H_Z$ | $H_Z$ | $H_Z$ | $H_{NM}$ | |
| $E_P$ | $C_H$ | $H_Z$ | $H_{AM}$ | $H_Z$ | $H_{NM}$ | $H_{NM}$ | $H_{NL}$ | |
| $T_{E_2}$ | $C_2$ | | | | | | | |

SENSOR #2

FIG. 15

DEVICE FOR SELF-VERIFYING TEMPERATURE MEASUREMENT AND CONTROL

RELATED APPLICATION

This application is a divisional of application Ser. No. 09/467,750, filed Dec. 20, 1999, now U.S. Pat. No. 6,473,708.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

TECHNICAL FIELD

This invention relates generally to temperature sensing techniques, and more particularly to a self-verifying device and method for temperature measurement and control.

BACKGROUND OF THE INVENTION

Many important properties of chemistry, physics, thermodynamics and heat transfer can only be determined by accurately measuring temperature. The measurement of temperature is fundamental to most modern industries. However, errors in temperature measurement can result in energy inefficiencies, creating scatter in product quality, shortening plant life, and limiting plant safety. The effects of temperature measurement error accumulate over days, weeks, and months of operation and are a significant cost to many industries.

One problem frequently encountered with conventional temperature measurement results from drift. Drift in temperature sensors can present a major roadblock to an industry's effort to create new product types or increase energy efficiency. For example, new gas turbine engines for the aircraft industry must operate at hotter temperatures in order to achieve increased fuel efficiency. Temperature sensors are required to monitor the hotter gas flow temperatures for the new engines in order to operate properly. In general, hotter temperatures tend to degrade sensors more rapidly and cause more rapid aging. Aging increases the probability of erroneous temperature readouts.

In fact, jet airliners must be taken out of service in order to re-check the calibration of thermocouples that monitor the temperature within gas turbine engines. Gas turbine temperature measurement becomes essential to establishing fuel combustion ratios. The cost to take airliners out of service for such check-up is considerable, but necessary, because there previously has not existed a convenient method of confirming the calibration of temperature sensors while they remain installed in a gas turbine engine. The requirement for calibration checks for new gas turbine engines that will operate at hotter temperature will compound the costs that result from temperature sensor decalibration. Furthermore, high maintenance and product quality costs are caused by temperature sensor decalibration that is common to a wide variety of modern industrial and transportation applications.

Sometimes the consequences of poor temperature measurement can result in catastrophic failures. One such accident destroyed the Three Mile Island-Two nuclear power plant, which could have been prevented by a quick and accurate measurement of reactor core temperatures. During such accident, reactor operators were unable to determine whether the reactor core was overheating. Ignorance over core temperature allowed the plant operators to make an erroneous conclusion about the state of the reactor core. The control decision error caused the loss of the Three Mile Island plant, with some total cost estimates running as high as $3 billion.

As another example, a recent DC-10 airplane crash was traced to failure of an engine support strut. The strut failure was subsequently traced to improper temperature control in a metal annealing process. Temperature sensors that controlled the annealing process had decalibrated, and the operator was unable to detect temperature drift in sensor readout.

The importance of accurate and reliable temperature measurement to modern processing and transportation industries is well documented by the above and similar examples that demonstrate the vulnerability of modern industry to temperature sensor drift. Furthermore, a number of techniques exist for monitoring temperature, but existing techniques each have associated problems.

For example, there exist a number of schemes and techniques for monitoring the intensity of heat by measuring temperature. One early technique entailed the monitoring of thermal expansion in order to sense a temperature. Such physical phenomena forms the basis for liquid-in-glass thermometers. Several other techniques involve electrical transduction which is employed to sense temperature. Among these are resistive, thermoelectric, semiconductive, optical and piezoelectric detectors. Temperature measurement involves the transmission of a small portion of an object's thermal energy to a sensor, the sensor functioning to convert that energy into an electrical signal. For the case where a contact sensor is used, the contact sensor is placed inside or on an object, with heat conduction taking place through an interface between the object and a probe. The probe warms up or cools down, exchanging heat with the object. Through careful design of a probe, the measurement site will not be disturbed significantly and error is minimized by appropriate sensor design via correct measurement techniques.

One problem associated with a significant number of such measurement techniques occurs when temperatures have to be measured under tough or hostile environments. Such tough or hostile environments can involve strong electrical, magnetic or electromagnetic fields, or very high voltages which make measurements either too susceptible to interferences, or too dangerous for an operator. Hence, one technique for solving such problems is to use non-contact techniques for measuring temperature. However, non-contact techniques do not work in many environments. Additionally, there exist contact sensors which can sense temperature in a hostile environment, such as thermocouples which measure resistive coupling of different materials when exposed to a temperature environment.

For the case of a thermocouple, comprising a thermoelectric contact sensor, at least two dissimilar conductors are used to make a sensor. A number of different thermocouples are known for use with different applications such as TypeT, TypeJ, TypeE, TypeK, Types R and S, and TypeB. Depending on the temperature and/or chemical environment encountered, a suitable thermocouple can be selected. However, one problem with thermocouple sensors results from "drift", as discussed above, which can adversely affect accuracy by causing measurement errors.

Another problem results from the aging of temperature sensors which can result in increases in temperature system error. Gregory K. McMillan, *Advanced Temperature Control*, published by The Instrument Society of America (1995), discusses mathematical methods to estimate the magnitude of error that has accrued on an aged temperature sensor. However, mathematical estimates of error are not adequate to correct for temperature sensor drift, in most industrial processes.

Modern industrial processes are carried out at ever-increasing temperatures. Such rise in operating temperature requires the measurement of temperature in service conditions that are increasingly corrosive or otherwise hostile to measurement instruments. For these reasons, temperature sensors increasingly age, or otherwise degrade, while operating under the combined stresses of modern service conditions. Such aging process causes errors in calibration to creep into the readout of temperature measurement instruments. Therefore, plant operators are required to detect drift in temperature sensor readouts, and to correct for such drift, or replace sensors that are known to have decalibrated. Replacement of such sensors usually requires a scheduled shutdown of the process. Accordingly, the detection of drift in temperature sensor readout is generally not easy. Furthermore, the scheduled shutdown of a process is undesirable and costly.

For example, thermocouple drift is usually caused by trace contaminants which migrate into the thermal element wires, changing their composition. The alteration in composition likewise changes signal output for a given temperature. Changes in such signal output cause an error in temperature readout. Other causes of thermocouple drift include breach of the outer protection sheath, which usually results in deterioration of the electrical insulation. Hence, errors are caused from shunting of the signals being generated by the thermal elements. Drift, or deviations in signal output, occur in most thermocouples as they age under the stresses of modern industrial conditions. Similar conditions cause drift in Resistance Temperature Devices (RTDs), or resistance devices.

As a further example, optical sensors commonly encounter drift problems. Such drift problems include the formation of films on optical surfaces that distort the frequency spectrum of the signal monitoring temperature. Additionally, other impairments may preclude an accurate determination of temperature, such as inability to correct for unknowns in emissivity of optical targets. For example, two-color devices often only partially correct for errors in emissivity.

Accordingly, the inability to verify in situ the calibration of temperature sensors also creates a major obstacle to the introduction of automated control systems in modern industrial plants. Such modern plants rely heavily on trained operators in order to detect when temperature sensors may be out of calibration. The operators determine that sensors are out of calibration by referring to secondary parameters that relate to temperature, such as increases in product defects, temperature measurements by nearby sensors, and increase in fuel consumption, or by other means, most of which are considered "black magic", or "art". According to presently existing temperature measurement technologies, automated temperature control loops are incapable of verifying temperature sensor accuracy. Such automated control loops are required to take the temperature sensor readout and treat it as "gospel" (assumed accurate), performing control functions that presume that the incoming readouts from temperature sensors remain accurate. Since all temperature sensors on the market today age when subjected to modern hostile service environments, the usefulness of fully automated temperature control loops is limited for many applications. Accordingly, improvements are needed to determine whether such temperature sensors remain accurate, and to provide for a useful control signal that is capable of being reliably utilized with fully automated temperature control loops for one of any of a number of applications.

Another technique for measuring temperature involves the use of optical non-contact temperature detectors comprising radiation thermometry. Radiation thermometry is also recognized under the name of pyrometry. Such a non-contact technique for measuring temperature utilizes a sensing element that is responsive to electromagnetic radiation in the infrared wavelength range. Such a sensing element must be fast, predictable and strong, responsive to thermal radiation, and have a good long-term stability. However, such optical thermal detectors are only suitable for use in limited temperature environments.

U.S. Pat. No. 5,183,338 discloses yet another temperature measurement system that is configured to overcome the limited effective temperature range typically encountered with optical sensor systems. A black body sensor is combined with a photoluminescent sensor to provide an optical apparatus capable of accurately measuring temperatures over a wide range. The black body sensor is more suitable for use with high temperature ranges, whereas the photoluminescent sensor is suitable for measuring temperatures over a lower temperature range. Such an optical probe is configured so as to provide both a black body sensor and a photoluminescent sensor. Signal processing is utilized to switch between the two sensors in the region where an overlap exists between the two temperature ranges. A limited ability to calibrate temperature measurements might be made within such overlapped temperature ranges by utilizing the photoluminescent sensor to calibrate measurements made by the black body sensor. However, such overlap range is relatively small and ineffective and does not necessarily provide an accurate calibration over the high temperature range and the low temperature range, outside the overlap region. Therefore, self-verification of temperature measurement is not possible over typical desired temperature ranges.

In summary, many modern industries face a fundamental problem in all temperature measurements; namely, there is no convenient means to verify the accuracy of temperature measurements while temperature sensors remain in an industrial use application. Temperature sensors are calibrated under laboratory conditions at the manufacturer's plant prior to shipment. Once such temperature sensors have been installed in an application, it is not generally convenient or possible to re-check the calibration of such sensors during operation. Therefore, removal of temperature sensors for verification of calibration in a laboratory is not usually practical. Furthermore, such sensor removal is never economical.

BRIEF DESCRIPTION OF THE DRAWINGS

Preferred embodiments of the invention are described below with reference to the accompanying drawings, which are briefly described below.

FIG. 2 is an enlarged centerline sectional view of the sensor head utilized in the apparatus of FIG. 1 illustrating containment of a first sensor and a second sensor therein;

FIG. 3 is a detailed functional block diagram of another presently preferred multiple temperature sensor package embodiment in accordance with the present invention;

FIG. 5A is a table showing examples of overall confidence levels for two sensors, each having a respective confidence level;

FIG. 5B is a table showing examples of overall temperature contributions for two sensors, each having a respective confidence level;

FIG. 14C is an explanatory view showing membership sets for applying commanded heat to a furnace using the fuzzy controller depicted in FIGS. 14A and 14B, with heater control commands being represented by individual membership sets responsive to application of the membership sets depicted in FIGS. 14A and 14B; and FIG. 15 is a table showing the fuzzy logic control commands for the fixed heater control system of FIG. 13, based on the membership functions given in FIGS. 14A, 14B and 14C.

SUMMARY OF THE INVENTION

Figure 1:
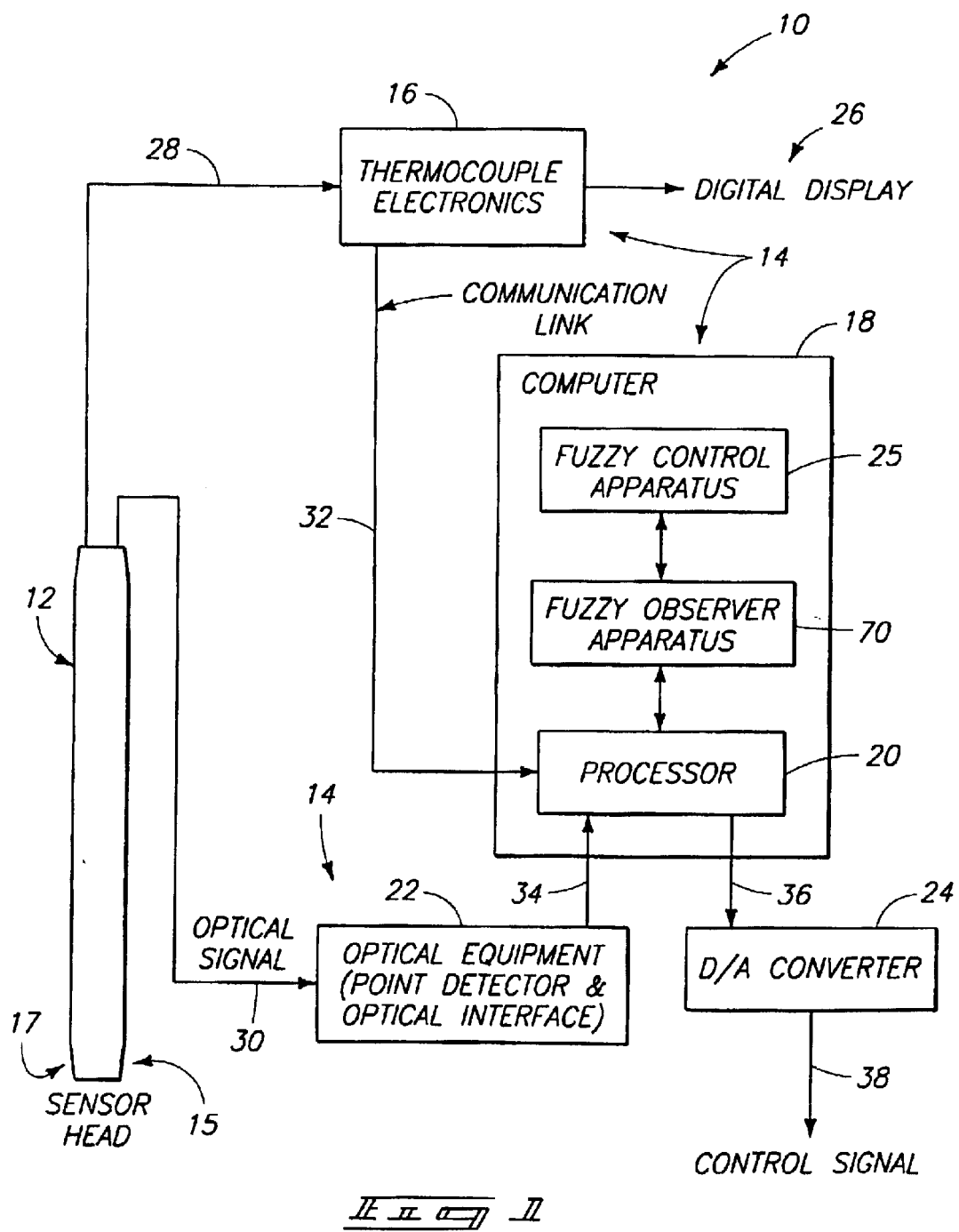
FIG. 1 is a functional block diagram of a presently preferred embodiment of a universal self-verifying temperature sensor and fuzzy logic controller comprising a temperature measurement apparatus in accordance with the present invention.

The present invention provides an apparatus and method for verifying the accuracy of a readout from a temperature sensor while it is in operation. Controlled decisions are then made on a measured value of temperature. The measured value of temperature is detected as being certain over a range of the temperature measurement system. Such a new sensor takes the guesswork out of temperature measurement, and offers significant benefits to modern processing, manufacturing, and transportation industries that place a high level of importance on accurate measurement of temperature.

In accordance with one aspect of this invention, a self-verifying temperature measurement apparatus includes a first sensor and a second sensor. The first sensor is operative to measure a first physical phenomena indicative of temperature of an associated medium. The second sensor is provided in heat transfer association with the first sensor. The second sensor is operative to measure a second physical phenomena indicative of temperature of the associated medium.

In accordance with a second aspect of this invention, a self-verifying temperature measurement system includes a sensor head, a thermocouple temperature sensor, an optical temperature sensor, and circuitry. The thermocouple temperature sensor and the optical temperature sensor are each associated with the sensor head. The circuitry is configured to receive a first temperature signal derived from the thermocouple temperature sensor and a second temperature signal derived from the optical temperature sensor. The circuitry is configured to detect decalibration of the thermocouple temperature sensor.

In accordance with yet another aspect of this invention, a temperature control instrument includes a first temperature sensor, a second temperature sensor, and a fuzzy inference machine. The first temperature sensor is configured to generate a signal indicative of temperature of a medium. The second temperature sensor is also configured to generate a signal indicative of the temperature of the medium. The fuzzy inference machine is configured to associate the first temperature sensor signal and the second temperature sensor signal and produce an output control signal indicative of status of the measured temperature.

It is an object of this invention to provide a temperature measurement system capable of obtaining a true temperature and verifying that the temperature is valid by utilizing a temperature measurement system comprising a first sensor configured to measure temperature via a first physical technique and a second sensor configured to measure temperature via a second physical technique. One such first physical technique comprises resistive coupling. One such second physical technique comprises optical detection of radiation emitted from a surface.

Another object of the invention resides in a self-verifying temperature measurement system provided with a first sensor utilizing a first physical technique for measuring temperature and a second sensor utilizing a second physical technique for measuring temperature, with the additional provision of a single, common sensor head.

Yet another object of the invention is the provision of a thermocouple sensor and an optical sensor, with the optical sensor configured to produce a temperature measurement that is compared with the temperature derived from the thermocouple sensor so as to enhance reliability of a temperature reading. Additionally, an optical cavity can also be provided with the optical sensor which is configured to simulate a black body source.

Even another object of the invention is to provide a temperature measurement control system, including a first sensor, a second sensor and a control system operative to associate temperature readings from each of the sensors. According to one implementation, the control system comprises a fuzzy logic control system. Also according to an implementation, the first sensor comprises a thermocouple sensor and the second sensor comprises an optical sensor. Even further, the thermocouple sensor can comprise a pair of thermocouple sensors configured together to implement self-verification of measured temperatures so as to eliminate drift.

Additional objects, features and advantages of this invention are to provide an apparatus and method for detecting a true value or temperature and for providing an output signal based on the temperature usable to control equipment associated therewith. Such an apparatus and method is extremely accurate, simple, economical and utilizes sensors which can be mounted on a common sensor head that is usable in a temperature measurement environment without the requirement that it be removed for maintenance and recalibration, which readily, easily and reliably measures true temperature and adjusts for failure of one sensor to serve as a back-up and which further enables accurate temperature detection, in a manner that is rugged, durable, of economical manufacture and assembly, can be calibrated and monitored in-use, and requires little service and maintenance.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A preferred embodiment of the invention is illustrated in the accompanying drawings particularly showing an apparatus and method for measuring temperature of a medium such as an object of interest generally designated with the numeral 10 in FIG. 1. It is understood that the object of interest may be all manner of gas, liquid or solid.

Referring in more detail to the drawings, FIG. 1 illustrates a functional block diagram of one embodiment of the invention in the form of a universal self-verifying temperature sensor and fuzzy logic controller comprising a temperature measurement apparatus 10. Temperature measurement apparatus 10 includes a single, common support structure in the form of a sensor head 12 that is signal coupled with electronics 14 to obtain a "true temperature" reading of a medium being monitored and self-verifying that the measured temperature is valid. According to the one implementation of the invention, electronics 14 includes thermocouple (TC) electronics 16, a computer 18 (including a processor 20), optical digitizing equipment 22, a digital-to-analog (D/A) converter 24, electronic circuitry implemented in combination with an algorithm to form a fuzzy control apparatus 25, and a display 26.

According to one construction, computer 18 comprises a personal computer having a microprocessor, memory, keyboard, display and associated peripherals. According to another implementation, computer 18 comprises a mainframe computer. According to yet another implementation, computer 18 comprises a network computer. Even furthermore, computer 18 can comprise a microprocessor-based computer system that is implemented on one or more motherboards and/or in combination with control or testing equipment for machinery or equipment. Computer 18 can be any one of a number of general-purpose machines such as analog computers or digital computers and embedded computers. For example, digital computers process data according to a set of instructions that are stored internally in memory, or in registers. Such a general-purpose machine includes hardware and software, with the software containing a set of instructions that perform a particular task via a software program. Such instructions direct a computer to input, process and output. Accordingly, computer 18 includes processor 20, in one implementation a microprocessor. Furthermore, computer 18 implements fuzzy control apparatus 25 via a combination of hardware and software.

Fuzzy control apparatus 25 comprises a fuzzy observer and a fuzzy logic controller that enables the obtaining and verification of a true and valid temperature reading produced from sensor head 12. Fuzzy control apparatus 25 can be implemented via any of a number of fuzzy logic or fuzzy inference machines suitable for use in detecting temperature measurements via sensor head 12. One such fuzzy inference technique suitable for use in forming fuzzy control apparatus 25 is taught with reference to U.S. Pat. No. 5,173,224, which is incorporated herein by reference as evidencing the implementation of thermo-control techniques between a temperature sensor and a computer. Further details of one fuzzy control apparatus 25 are discussed below in greater detail with reference to FIGS. 3–14.

Temperature sensor head 12 is configured to produce a plurality of thermocouple (TC) signals via thermocouple signal line 28 to thermocouple electronics 16. Additionally, sensor head 12 produces an optical signal output via optical signal line 30 for delivery to optical digitizing equipment 22. Thermocouple electronics 16 processes the thermocouple signals of signal line 28 to produce a thermocouple temperature measurement that is calibrated for drift. Such a calibrated thermocouple signal is delivered from thermocouple electronics 16 to processor 20 of computer 18 by way of a communication signal line 32.

In order to receive an electronic representation of a detected optical signal from optical signal line 30, optical digitizing equipment 22 is utilized to convert such optical signal into an electrical signal that can be processed via processor 20. Accordingly, processor 20 is electrically signal coupled with optical digitizing equipment 22 by way of a communication signal line 34. Furthermore, processor 20 is signal coupled with D/A converter 24 by way of a D/A converter signal line 36. Optionally, a digital control system can be used.

As shown in FIG. 1, D/A converter 24 receives a signal from processor 20 in the form of a digital signal via signal line 36. According to one implementation, the signal indicates a calibrated and verified "true temperature". D/A converter 24 is utilized to convert such digital signal into an analog control signal via output signal line 38. Optionally, D/A converter 24 can be eliminated such that the control signal is an analog signal which is delivered along output signal line 38 to a heater of a manufacturing/operating process. Further optionally, D/A converter 24 can be used to output a signal to any piece of equipment.

According to the implementation depicted in FIG. 1, optical digitizing equipment 22 is formed from an optical interface and a detector. Such optical interface enables detection of an optical signal via signal line 30 from sensor head 12. Such point detector enables detection of such optical signal and conversion into a digital signal that is delivered along communication signal line 34 to processor 20. One such optical interface comprises an optical connection between a fiberoptic cable and a lens, with the detector comprising a measuring instrument that converts the intensity of emitted radiation delivered along a fiberoptic cable into temperature. One such measuring instrument comprises a silicon photodiode configured for use as a detector in combination with a narrow bandwidth optical filter used in conjunction with such photodiode. An electrical signal is output from the photo detector which is related to the temperature of a simulated black body cavity within sensor head 12.

To produce a calibrated and verified "true temperature", temperature sensor head 12 includes an optical temperature sensor 15 and a thermocouple (TC) temperature sensor 17. As shown below in greater detail with reference to FIG. 2, optical temperature sensor 15 comprises. a simulated black body cavity configured for non-contact measurement of a temperature within a medium or object. More particularly, such optical temperature sensor 15 comprises a thermal infrared detector capable of non-contact temperature measurement via radiation thermometry, or pyrometry.

In accordance with sensor head 12, thermocouple (TC) temperature sensor 17 comprises a pair of thermocouple sensors which are configured together with thermocouple electronics 16 (see FIG. 1) to enable contact temperature measurement of a medium and calibrate for drift associated with thermocouple sensors. Details of such thermocouple sensors and thermocouple electronics 16 are described below in greater detail with reference to FIG. 2.

As shown in FIG. 2, sensor head 12 comprises a first sensor 15 and a second sensor 17, with the first sensor operative to measure temperature via a first physical technique and the second sensor operative to measure temperature via a second physical technique. More particularly, the first sensor comprises optical temperature sensor 15 and the second sensor comprises thermocouple temperature sensor 17. As illustrated in vertical, centerline-sectional view, sensor head 12 is formed from a sheath comprising a tubular support member 40, an end sheath 42 integrally formed from a distal end of support member 40, and a sealed cap 44 received on a proximal end of support member 40. A fiberoptic cable 46 is received in sealed and mating engagement through sealed cap 44 where cable 46 communicates in optically conductive relation with a simulated black body cavity emulating light therein 48.

A pair of resistive coupling sensors formed of different materials, comprising thermocouple (TC) sensors 50 and 52, are provided in a distal end of support member 40, adjacent end sheath 42. Sensors 50 and 52 are each electrically coupled with thermocouple electronics 16 (see FIG. 1) by way of pairs of thermocouple wires 54, 55 and 56, 57, respectively. Wires 54–57 are illustrated collectively in simplified form in FIG. 1 as a single thermocouple signal line 28 (of FIG. 1).

Optical temperature sensor 15 and thermocouple temperature sensor 17 are encased inside the sheath of tubular support member 40, including integrally formed end sheath 42 and sealed cap 44, within a dielectric material 58. Optical temperature sensor 15 and thermocouple temperature sensor 17 comprise a pair of sensing elements that are contained within a common, composite sensor head 12 such that both sensors are provided in thermal equilibrium. Accordingly, sensors 15 and 17 are thermally connected in such a manner that there is no significant difference in temperature between the two, or more, sensors 15 and 17.

As shown in FIG. 2, sensor head 12 provides optical sensor 15 and thermocouple sensor 17 within a common protective sheath; namely, within an end cavity 60 of sheath 40, 42, 44. Accordingly, any temperature differences between the sensing elements of sensors 15 and 17 will appear negligible.

As shown in FIG. 2, sensor head 12 comprises a composite sensor having a contact portion including sensors 15 and 17 provided within a sheath 40, 42, 44. Sensors 15 and 17 are contained within a dielectric material, except for in the region of end sheath 42. The region adjacent end sheath 42 preferably forms an end cavity 60 comprising an optically clear region that is formed within end sheath 42 at the end of light pipe 48. End sheath 42 contains a simulated black body cavity forming layer (not shown) that is applied therealong, preferably to an inner surface.

As shown in FIG. 2, end cavity 60 comprises an empty region within end sheath 42. Alternatively, the region of end cavity 60 can be filled with a second ceramic component, such as a hard-fired piece of alumina, sized to fill such void. Furthermore, other end cavity configurations are also possible. In order to realize proper functioning of sensor head 12, it is not necessary to fill the void region defined within end sheath 42. However, it may be desirable for some designs to provide a spacer or other shaped components within end sheath 42 in order to minimize the effects of vibration. More particularly, it may be desirable to mechanically secure the internal components of sensor head 12, or to fine tune the readout from optical cavity, or light pipe, 48. Furthermore, secondary improvements to the overall performance of sensor head 12 can be achieved by providing such additional internal components.

According to one construction, thermocouple temperature sensor 17 is mounted within tubular support member 40, above integrally formed end sheath 42, and within a preformed alumina rod 59 of ceramic material 58 that is inserted therein. Light pipe 48 is first formed within dielectric material 58 in the form of a cylinder. At the same time, a receiving hole 49 is formed within dielectric material 58. More particularly, dielectric material 58 comprises a hard-fired alumina tube, or rod, 59 having two bore holes 48 and 49, and a second, smaller hard-fired alumina thermocouple insulator rod, also having two bore holes 63 and 65.

More particularly, according to one construction alumina rod 59 is extruded to form bore hole 48, which forms a light pipe, and bore hole 49, which receives alumina insulator rod 61. Alumina insulator rod 61 is formed with bore holes 63 and 65, each containing thermal element wires. Accordingly, bore hole 48 forms an optical port, whereas bore hole 49 forms a tube for receiving insulator rod 61 and associated thermal element assemblies.

Alumina rod 59 is readily available from a number of commercial suppliers. Omega, Inc., Stanford, Conn. 06906, produces one such alumina rod having two interior bore holes with the same diameter. However, for some applications, it may be advantageous to have one diameter sized for light pipe 48 and another sized for bore hole 49 to contain the thermocouple assembly. Although advantages might be gained from providing different diameters for holes 48 and 49, such advantages are secondary, such as optimizing the life of thermal element wires, that are not essential to the basic functioning of Applicant's invention. One suitable supplier for customized alumina rod is Ozark Technical Ceramics, 402 Ware Street, Web City, Miss. 64870.

As shown in FIG. 2, a fiberoptic cable 46 is coupled for optical communication with light pipe 48 by mating it with a topmost end of a simulated black body cavity provided by light pipe 48 emulating light therein, adjacent sealed cap 44.

Light pipe 48 comprises an optical port portion of the hard-fired alumina rod 59. Alternatively, other known materials having similar properties can be substituted for alumina.

As shown in FIG. 2, alumina thermocouple rod 61 contains bore holes 63 and 65, one bore receiving one of a matched pair of thermal element wires, such matched pair of wires 55, 54 and 57, 56, respectively, are joined together by welding so as to form a welded thermocouple joint 50, 52, respectively. Hence, the matched pair of thermal element wires are welded together so as to form sensors 50 and 52, respectively. Sensors 50 and 52 each comprise a welded thermocouple joint.

One suitable matched pair of thermal element wires 55, 54 and 57, 56 comprise Type S (Pt vs Pt 10% Rh). Other types comprise Type R (Pt vs Pt 13% Rh), or Type B (Pt 6% Rh vs Pt 30% Rh). According to one construction, Type B thermal element wires are preferred.

In order to realize the basic improvements of Applicant's invention, it is not necessary to have any specific type of thermal element wires. Any type of thermal element wires, including Type S, Type R, or Type B, may be utilized. However, Type B is presently understood as being a preferred type of thermal element wire. However, the advantages inherent in a particular thermocouple type are secondary to the basic functioning improvements of the sensor provide by Applicant's invention.

Also shown in FIG. 2, an optional thermocouple wire connecting plug 45 can be provided for removably connecting lead wires 55, 54 and 57, 56 that connect to the processing electronics forming sensors 50 and 52. However, connecting plug 45 is not necessary when implementing Applicant's invention. Such end plug forms a removable access port that is only provided for convenience when disconnecting wires 54–57 from sensor head 12.

Also according to FIG. 2, tubular sheath 40 (including end sheath 42) is formed from a hard-fired alumina protection tube, closed at end sheath 42, and open at the opposite end in order to allow passage of leads to processing electronics therein. Accordingly, sealed cap 44 is removably mated with such end of tubular sheath 40.

As illustrated in FIG. 2, optical temperature sensor 15 comprises a black body sensor having details similar to those disclosed in U.S. Pat. Nos. 4,576,486, 4,750,139, 4,845,647 and 5,183,338. Such black body sensors are designed primarily for measuring extremely high temperatures, with an optically transmitting probe that can withstand such temperatures being coated at one end with an appropriate opaque material forming a black body cavity. Temperature-dependent infrared emission is received from the black body cavity and is carried along the optical transmission medium to a connecting optical fiber, and then to a measuring instrument. Alternatively, an object or surface external of the sensor can be shaped into a black body cavity, with a light pipe being used to gather, with or without a lens system, emissions for transmission to a detector, without actually contacting such black body.

According to the one construction described above, light pipe 48 is configured as a hole, or aperture, formed within dielectric material 58. Light pipe 48 has a length and diameter sized to form an aspect ratio of at least 5-to-1 which simulates a black body source. Additionally, end cavity 60 is formed by a gap that is transparent to the wavelength being detected. Optionally, an end plug can be placed into cavity 60 formed from a material such as a dielectric material that is optically clear and that forms a window which is impermeable to environmental factors, but transparent in the wavelength being detected. End sheath 42 may have surface coatings that improve transparency, and filter out undesirable portions of the light spectrum.

A housing which is provided by support member 40, sheath 42 and cap 44 protects optical sensing element 15 and exposes it to radiation. Hence, such structure should be configured to have a low thermal conductivity in order to minimize heat loss. One such suitable structure can be formed from a rigid, thermally conductive material. Hence, optical temperature sensor 15 forms a sensing element having a component which is responsive to electromagnetic radiation within the infrared wavelength range. Such element should be fast, predictable and strongly responsive to thermal radiation, and have a good long-term stability. Hence, such an optical temperature sensor 15 will provide an infrared non-contact temperature sensor suitable for use in performing radiation thermometry, or pyrometry.

As illustrated in FIG. 2, it is to be understood that sensor head 12 is configured to place optical temperature sensor 15 and thermocouple sensor 17 within an environment, or a medium, to be measured. One such environment comprises a glass furnace. Other environments comprise refineries, petrochemical plants, and pulp and paper manufacturing, heat treating, and processing machines. A typical medium might comprise molten glass. Other typical mediums might comprise any of a number of liquid, gaseous or solid materials positioned within a thermal environment such that it is desirable to accurately determine temperature of the medium, particularly extending over a long period of time.

When implemented as a simulated black body sensor, optical temperature sensor 15 involves the placement of a black body cavity at the end of an optical light pipe 48 by depositing a film at such location, as described in the aforementioned U.S. Pat. No. 4,576,486, which is incorporated herein by reference. A black body cavity forming layer, such as platinum-rhodium, is provided in a thin layer inside end sheath 42. According to one implementation, end sheath 42 is coated on an inner surface. Preferably, the layer is made to be thin in order to provide a fast temperature response. The cavity of light pipe 48 emits, in a direction along the length of the light pipe, electromagnetic radiation corresponding to the infrared end of the optical radiation spectrum. As a result, an infrared optical signal is passed through fiberoptic cable 46 back to the electronics 14 (of FIG. 1). Such electronics form a measuring instrument that is configured to convert the intensity of the emitted radiation into a representative temperature signal indicative of a measured temperature.

As a result, optical temperature sensor 15 forms a simulated black body sensor having a spectrum of emission contained generally within the infrared range. The intensity of such spectrum of emission increases with increasing temperature. According to one implementation, the optical signal carried along signal line 28 (of FIG. 1) is bandwidth limited since the construction of the light pipe and the optical fiber connection provides a limiting, or filtering, effect to such transmission.

According to one construction, a silicon photodiode is used as a detector and a narrow bandwidth optical filter configured less than one micron in wavelength is used in conjunction therewith. An electrical signal output is received from such photo detector which is related to the temperature of the black body sensor. As illustrated in FIGS. 1 and 2, temperature measurement apparatus 10 comprises a self-verifying temperature sensor and fuzzy logic controller consisting of a temperature sensor and a fuzzy logic observer. Such a system is configured to obtain a "true temperature" and verify that such measured temperature is valid using two sensors that each operate with different physical techniques. Furthermore, such apparatus produces an output signal suitable for use in controlling temperature of an environment, device or machine. Such measurement apparatus comprises a temperature system and method that uses two different physical techniques in order to obtain temperature readings of a medium.

According to the implementation of FIGS. 1 and 2, resistive coupling of different materials (thermocouples) and optical determination of the radiation emitted from a surface (pyrometer) are combined to form a measured and calibrated temperature reading. The design of such a system makes it inherently superior to conventional thermocouples in that the degree of accuracy is improved, the lifetime is increased, and enhanced reliability is achieved.

Preferably, sensor head 12 is constructed so as to withstand a severe thermal and moisture environment. Hence, sensor head 12 is fabricated from advanced materials, such as hard-fired alumina formed as a protective tube, or oversleeve. Such advanced materials increase sensor lifetime and eliminate thermocouple drift due to material degradation. Thermocouple signals received from thermocouple temperature sensor 17 are monitored by electronics in order to determine and correct for drift, on a continuous basis, hence improving accuracy. When the magnitude of drift is determined, input from the thermocouples is adjusted via the TC electronics 16 (of FIG. 1) in order to enable determination of the "true temperature".

As shown in FIG. 2, thermocouple wires 54–57, alumina rod 61, plug 45 and tubular sheath 40 are commercially available in a variety of diameters and lengths from a variety of suppliers in the form of standard thermocouple components. One optimum outside diameter for a complete assembly of sensor head 12, using sleeve 40, is ⅜", with interior components sized to form a snug-fitting assembly, sufficiently loose to allow assembly, but not so loose as to allow unnecessary movement between the respective components. One such suitable supplier for wires 54–57, rod 61, plug 45 and sleeve 45 is Omega, Inc., of Stanford, Conn. 06906.

The reliability of a temperature sensor is greatly increased via the design of this invention by adding optical temperature sensor 15 and associated temperature circuitry. The optical temperature readings are compared to the temperature derived from the thermocouples in order to determine whether any one of the thermocouples might have failed during operation. Hence, the optical intensities which are measured by optical temperature sensor 15 cooperate with the thermocouple inputs, aiding in the accurate adjustment of the measured temperature should one of the thermocouples fail. Additionally, optical temperature sensor 15 can be used to recalibrate one or more of the thermocouples, without having to remove sensor head 12 from a measurement environment.

Accordingly, a self-verifying temperature control system such as temperature measurement apparatus 10 of FIG. 1 contains three components: First, a sensor probe is provided that contains two thermocouples; and further contains at least a 5:1 (length to diameter) ratio hole for optical sensing. Secondly, verification electronics are provided. Thirdly, a processor and optical digitizing equipment are provided that are configured to convert optically-transmitted light intensities into temperatures, and execute a fuzzy logic control algorithm, and produce a signal for zonal furnace control (according to one implementation).

As shown in FIG. 1, the temperature system components of one such temperature measurement apparatus 10 are illustrated. Accordingly, temperature sensor head 12 is provided with optical temperature sensor 15 which forms an optical sensing component having at least a 5-to-1 ratio hole in the form of light pipe 48 (see FIG. 2) located in the distal end of the sensor. Such an aspect ratio hole closely approximates a black body source, decouples the effects of emissivity, and enables optical temperature determination.

Thermocouple electronics 16 are configured to display digital data on digital display 26 and implement "true temperature" verification when desired, or upon demand. A photo detector of optical digitizing equipment 22 can be configured within computer 18, or configured as a separate entity that is signal coupled with processor 20. The photo detector and optical interface cooperate to reduce optical data in the form of an optical signal carried along line 30. Hence, such optical data can be converted into a form recognizable by the computer processor 20, or microprocessor, which can be utilized to determine an optically detected temperature. Additionally, fuzzy control apparatus 25 is implemented via processor 20 to execute a fuzzy logic control algorithm that outputs a signal usable for controlling equipment. Examples of such equipment include a heater, a furnace, an oven, or any other apparatus or machinery requiring thermal regulation and/or monitoring.

In operation, wires 54–57 and fiberoptic cable 46 provide inputs from sensor head 12 that are received by electronics 14 in order to determine detected temperature. For the case of wires 54–57, sensor head 12 detects and delivers electrical signals indicative of temperature detected by thermocouple temperature sensor 17. In the case of fiberoptic cable 46, optical signals are perceived from optical temperature sensor 15 and are delivered to optical digitizing equipment 22 (of FIG. 1).

The electrical signals along line 28 are converted via thermocouple electronics 16 and are fed to processor 20 by way of communication line 32. The optical signals along line 30 are then converted by optical digitizing equipment 22 into electrical signals that are delivered along communication signal line 34 to processor 20. In this manner, processor 20 receives a pair of electrical signals representative of detected temperature output from optical temperature sensor 15 and thermocouple temperature sensor 17, respectively.

Based upon the received signals from sensors 15 and 17, processor 20 computes a confidence level for the temperature, which has generally been found to be in the range of 99.9%. Electronics 14 and temperature measurement apparatus 10 are capable of ascertaining on a continuous basis whether the temperature sensed by sensor head 12 does remain within calibration. Processor 20 can detect decalibration by comparing the readings from sensors 15 and 17. In the event that processor 20 detects that one of temperature sensors 15 and 17 has suffered decalibration, the electronics immediately detect the decalibration, and report to the operator via digital display 26 or fuzzy logic observer apparatus 25 the degree of decalibration.

Additionally, optical intensities are received from optical temperature sensor 15 via sensor head 12 by way of the optical digitizing equipment 22, which is converted to an electrical temperature signal. The electrically converted signal from the optically determined temperature signal is then compared to the thermocouple-derived temperatures in order to perform a second independent temperature indication check. Hence, the fuzzy logic control system, or operator, can output a "true value or temperature" which can be used to control the processing temperature of a system or apparatus. A fuzzy logic control algorithm implemented via fuzzy control apparatus 25 receives a thermocouple temperature detected from the thermocouple electronics 16 and a corresponding optically determined temperature detected from the optical digitizing equipment 22 in order to control process temperature. Such self-verifying sensor does not require removal for recalibration since the optical signal of line 30 and the thermocouple signal of line 28 are compared via electronics 14 to determine whether the thermocouple sensors are calibrated and are operating properly. Such a recalibration can thereby be implemented without removal of sensor head 12 from an in-use environment such as a furnace or an oven.

In summary, temperature measurement is performed via two distinct physical measurements in a manner that enables comparison by signal processing electronics within computer 18 in order to verify that a temperature readout has remained accurate. Such temperature measurement comprises the fundamental principle of operation of Applicant's present invention.

FIG. 3 illustrates in greater detail a specific implementation of the apparatus depicted in FIG. 1 as utilized to provide control signals usable by a high temperature process comprising a heat furnace 19. A plurality of sensor heads 12A–C are provided within furnace 19 at selected locations for monitoring temperature realized therein. Each sensor head 12 is provided with an associated temperature sensor package 62, 64 and 66, respectively. Temperature sensor package 62 is illustrated in greater detail as including thermocouple electronics 16, optical electronics 22, and fuzzy observer 70. It is understood that additional temperature sensor packages 64, 66 are similarly provided. Each temperature sensor package 62, 64 and 66 is configured to operate according to the sensor 12 depicted in FIG. 1. Furthermore, an additional sensor 72 is provided with electronics conditioning hardware 68.

Sensor 72 and electronics conditioning hardware 68 provide an input to fuzzy controller 25 indicative of a particular process parameter associated with furnace 19. For example, one suitable configuration for sensor 72 comprises a pressure sensor operative to determine the quantity of heated fluid material present within furnace 19. Other possible implementations for sensor 72 can also be realized.

As shown in FIG. 3, fuzzy controller 25 receives inputs from temperature sensor packages 62, 64 and 66, electronics conditioning 68, and additional inputs 74. One such set of additional inputs comprises additional temperature sensor packages (not shown) provided from other zones within furnace 19. Another additional input can be provided for a gas flow control valve sensor configured to measure the flow of gas into burners provided about furnace 19 and operative to deliver heat thereabout. Even further additional inputs can be provided by one or more flow rate sensors operative to detect the flow of gas into such burners. Any of the above additional inputs can be provided within a single, common control package provided by fuzzy controller 25.

More particularly, fuzzy controller 25 cooperates with fuzzy observer 70 of each sensor package 62, 64 and 66 so as to form a fuzzy inference machine. Fuzzy observers 70 each comprise a decision-making apparatus that receives inputs that represent a confidence level and a temperature for the thermocouple sensor 17 and optical sensor 15, of each associated sensor head 12, respectively. The fuzzy observer 70 of each sensor package 62, 64 and 66 provides an input to fuzzy controller 25 comprising an associated confidence level and a temperature. Fuzzy controller 25 determines specific control signals for furnace 19 (namely for operating associated burners of furnace 19). Hence, fuzzy controller 25 determines control signals and parameters for operating a particular high-temperature process, such as furnace 19. Accordingly, fuzzy controller 25 comprises a controller having a multiple input/multiple output configuration. However, it is understood that any of a number of controllers and/or control systems can be utilized in substitution for fuzzy controller 25. However, the specific implementation of a controller in the form of fuzzy controller 25 provides certain additional benefits inherent in Applicant's invention. Fuzzy controller 25 provides one or more control signals 38 for input to a high-temperature process such as furnace 19.

FIGS. 4–15 illustrate one exemplary implementation for a fuzzy controller 25 and a fuzzy observer 70 system as depicted in FIG. 3. More particularly, a high-temperature process is illustrated (see FIG. 13) with furnace 100 wherein two temperature sensor packages 62 and 64 are utilized to detect and control temperature within a high-temperature process with fuzzy controller 25, via each fuzzy observer 70 within each sensor package 62 and 64.

Figure 4A:
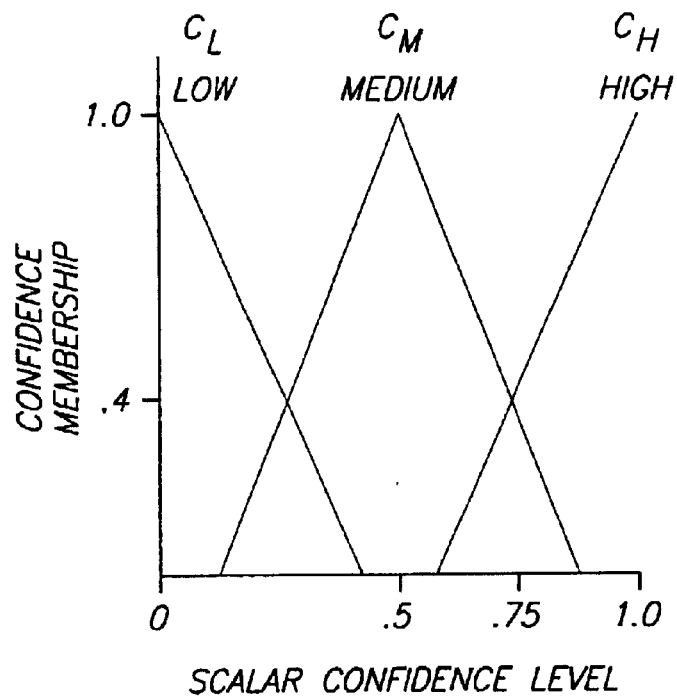
FIG. 4A is an explanatory view showing examples of membership sets for measurement confidence levels.

More particularly, FIG. 4A illustrates an example of membership sets for confidence level measurements from sensor electronics 16 and 22 as well as the observed confidence output from the fuzzy observer 70 of FIG. 3. Note that each sensor package 62 and 64 contains two physical sensors depicted as 17 and 15 within FIG. 3. Membership sets are depicted for several different confidence levels ranging from low ($C_L$), medium ($C_M$), and high ($C_H$). For each level, membership values are plotted against scalar confidence levels.

Figure 4B:
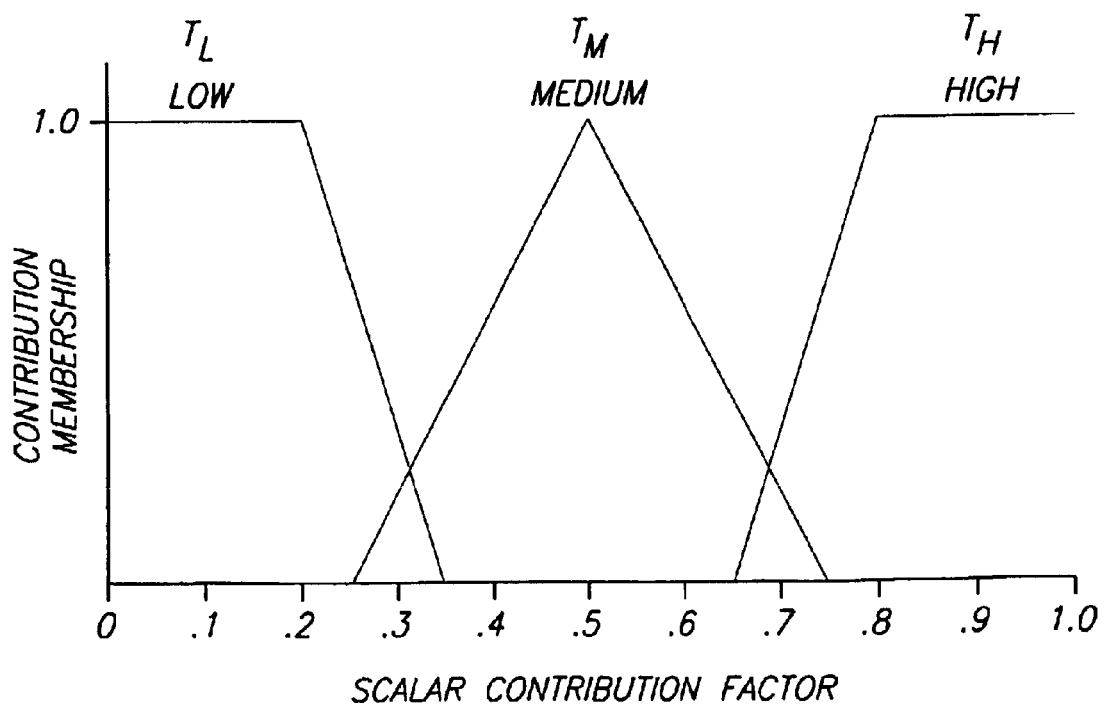
FIG. 4B is an explanatory view showing examples of membership sets for temperature averaging factors.

FIG. 4B is an exemplary view showing an example of membership sets for temperature contribution factors used to combine the temperature measurements from sensor electronics 16 and 22 in FIG. 3. According to FIG. 4B, contribution sets are shown for low temperature contribution ($T_L$), medium temperature contribution ($T_M$), and high temperature contribution ($T_H$). Such contribution level sets are plotted for membership values versus a scalar contribution factor.

FIG. 5A is a table showing the fuzzy logic rule base used to combine the confidence level from sensors #1 and #2, corresponding with the output signals from electronics 16 and 22 (of FIG. 3) into a unified confidence level for the observed temperature.

Figure 5B:
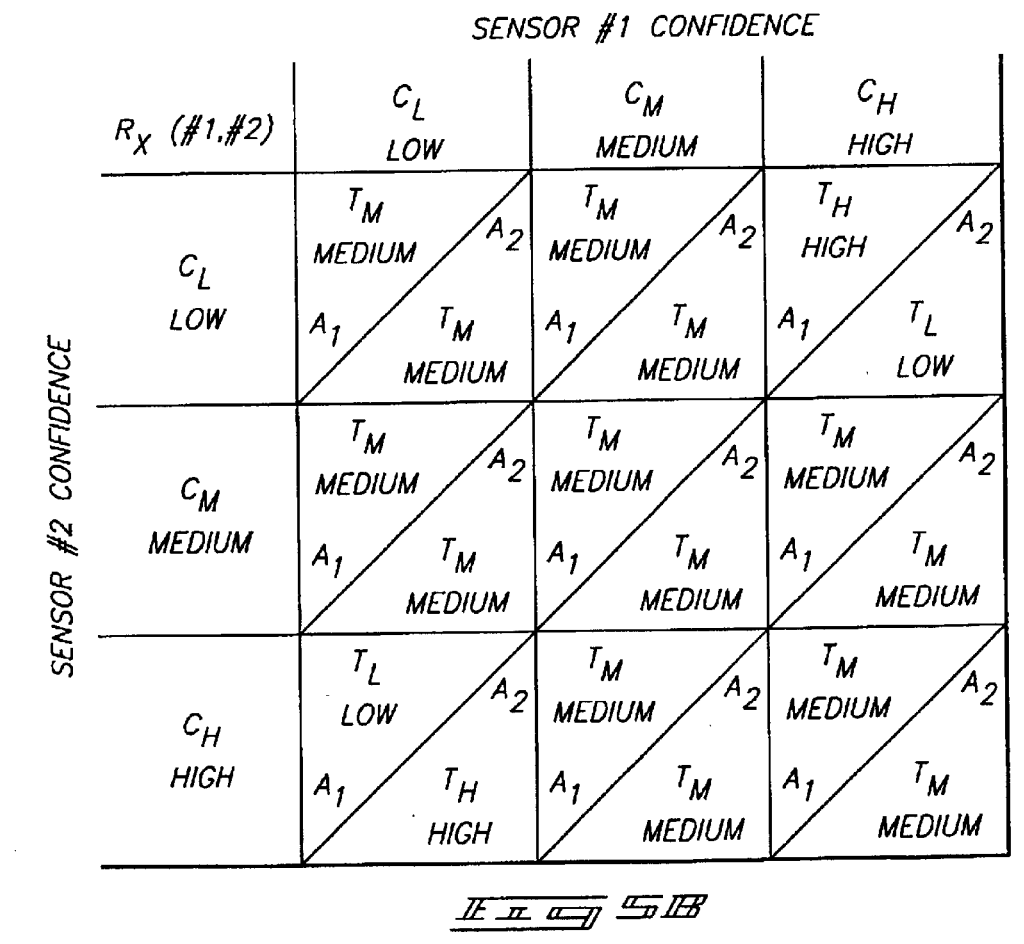

FIG. 5B is a table showing the fuzzy logic rule base used to combine the temperature measurements from sensors #1 and #2, corresponding with the output signals from electronics 16 and 22 (of FIG. 3) into an observed temperature.

EXAMPLE 1

One exemplary observer calculation is illustrated for a set of inputs received by a single sensor head 12A, via sensors 15 and 17, as illustrated in FIG. 3, and utilizing the fuzzy operating system parameters provided above with reference to FIGS. 3, 4 and 5.

One exemplary input provides for the following values for confidence level and temperature. As used below, "sensor #1" comprises an optical temperature sensor 15 (of FIG. 3). Additionally, "sensor #2" comprises thermocouple temperature sensor 17 (of FIG. 3).

Input
    Sensor #1:
        0.75 confidence level
        $T_1 = 120°$ C. temperature Sensor #2:
  0.5 confidence level
  $T_2$=180° C. temperature For the above exemplary values, the associated confidence levels and temperatures are input into a fuzzy observer 70 (of FIG. 3) in the form of scalar inputs.

The scalar inputs are then converted into fuzzy membership sets. Following which, a max-product fuzzy mathematical relationship calculation based on FIG. 5A is then performed in order to realize a particular confidence level set, FIG. 9, which is defuzzified into a scalar by the calculation in Equation 1.

Figure 6A:
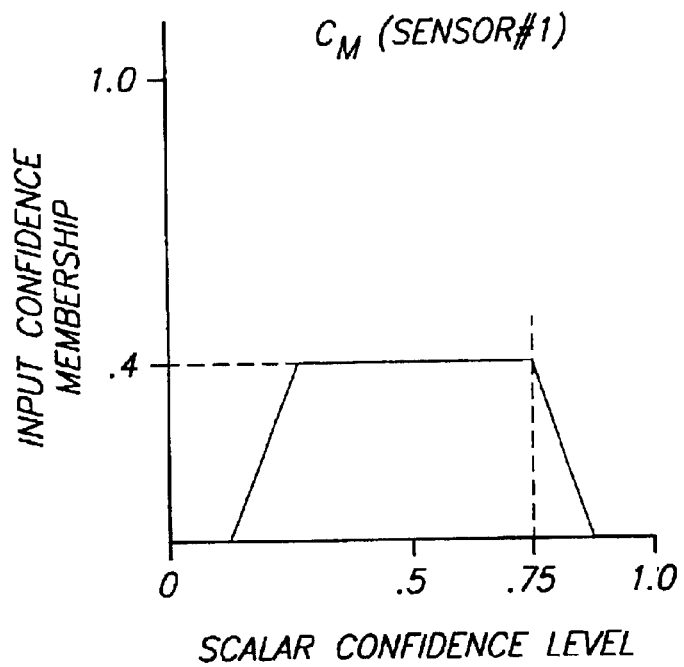
FIG. 6A is an explanatory view showing an exemplary "medium" membership set for a first sensor comprising fuzzy inputs, for a max-product fuzzy mathematical relation indicative of confidence level.
Figure 6B:
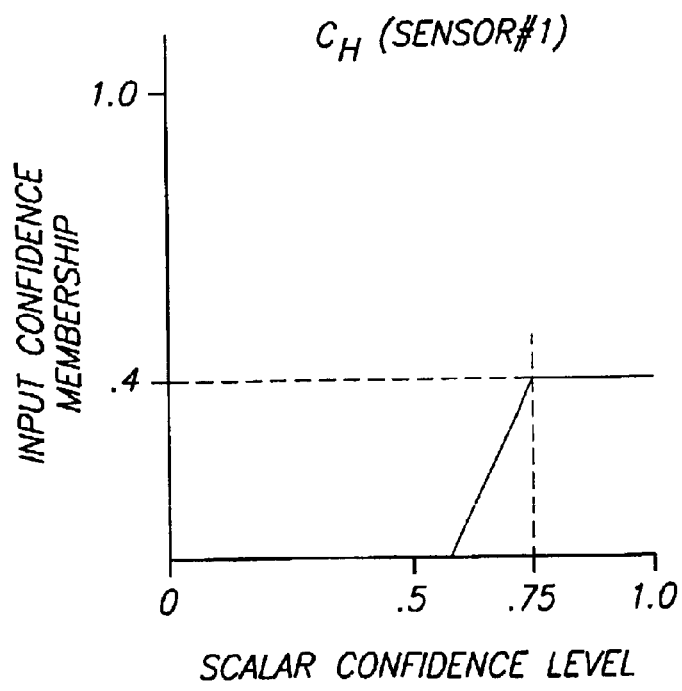
FIG. 6B is an explanatory view showing an exemplary "high" membership set for a first sensor comprising fuzzy inputs, for a max-product confidence level.

The fuzzified input sets for the confidence level from sensor #1 are $C_M$ (0.75), FIG. 6A, and $C_H$ (0.75), FIG. 6B. Likewise, the fuzzified input set for the confidence level from sensor #2 is $C_M$ (0.5), FIG. 7. Note that there is not any membership for $C_L$ for either sensor and also no membership for $C_H$ for sensor #2.

Figure 7A:
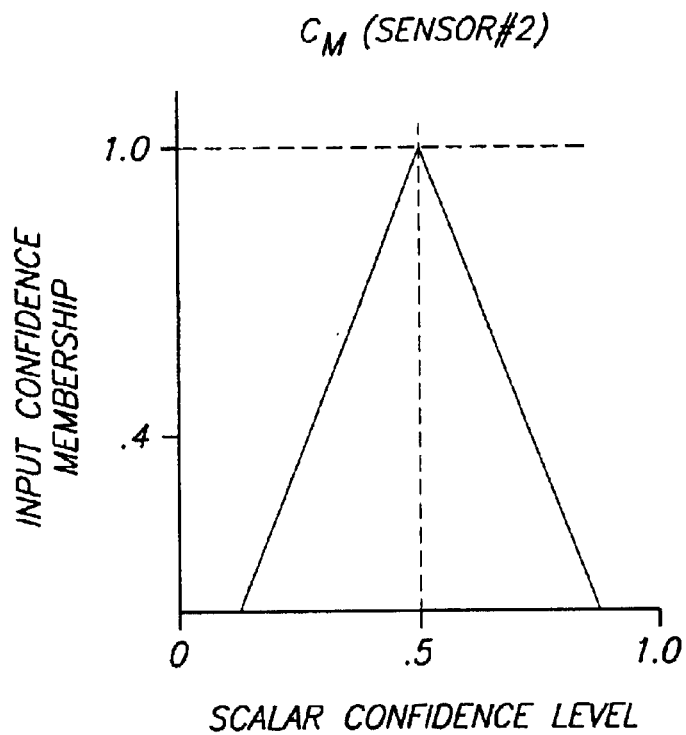
FIG. 7A is an explanatory view showing an exemplary "medium" membership set for a second sensor comprising fuzzy inputs, for a max-product confidence level.

FIG. 6A illustrates an exemplary fuzzification of a scalar confidence level of 0.75 into its fuzzy $C_M$ set. Similarly, FIG. 6B illustrates an exemplary fuzzification of a scalar confidence level of 0.75 into its fuzzy $C_H$ set. In addition, FIG. 7A illustrates an exemplary fuzzification of a scalar confidence level of 0.5 into its fuzzy $C_M$ set.

Figure 8A:
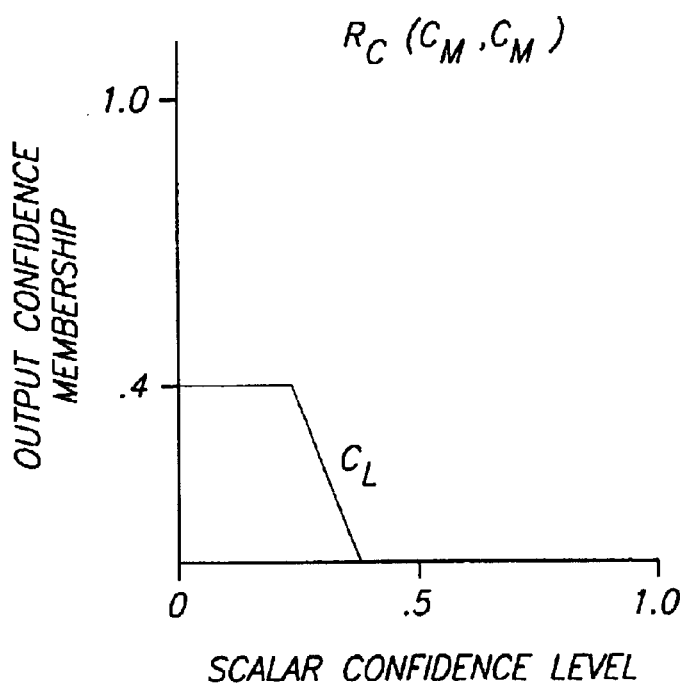
FIG. 8A is an antecedent max-product fuzzy mathematical relation for the confidence level based upon fuzzy control rules, and using fuzzy inputs from both sensors depicted in FIGS. 6A and 7A.
Figure 8B:
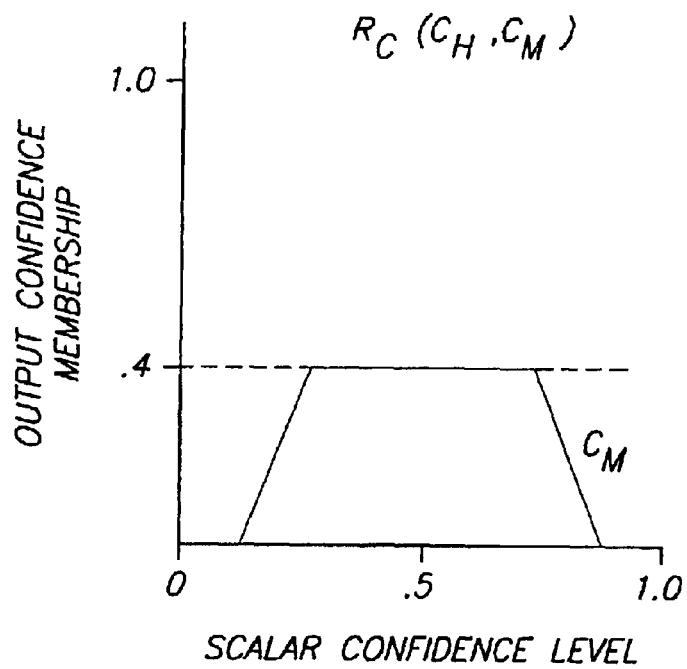
FIG. 8B is an antecedent max-product for the confidence level based upon fuzzy control rules, and using fuzzy inputs from both sensors depicted in FIGS. 6B and 7B.

FIG. 8A illustrates the fuzzy max-product resultant confidence set from rule $R_C$ ($C_M$, $C_M$) shown in FIG. 5A. Likewise, FIG. 8B illustrates the fuzzy max-product resultant confidence set from rule $R_C$ ($C_H$, $C_M$) shown in FIG. 5A. The remaining fuzzy rules from the table in FIG. 5A are empty.

Figure 9:
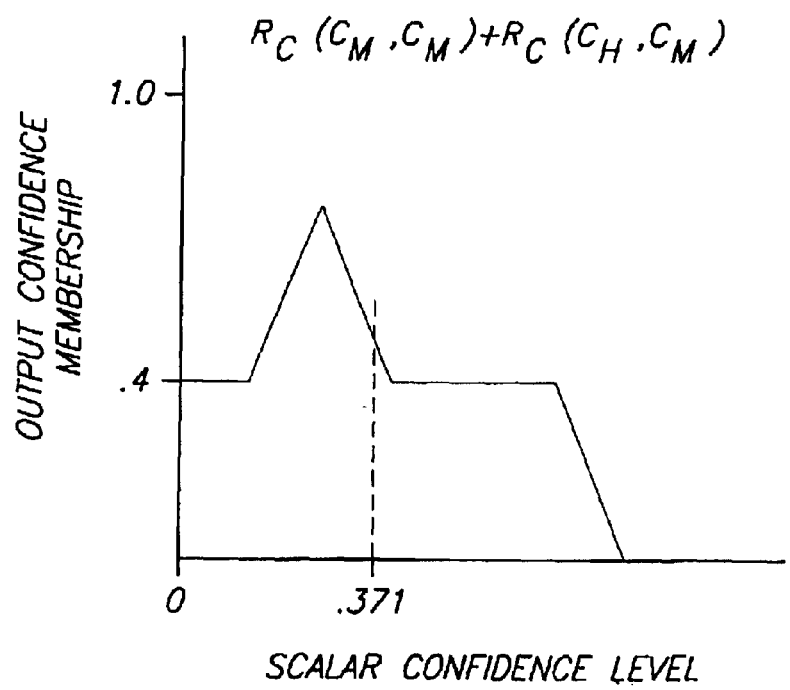
FIG. 9 is an explanatory view showing an exemplary fuzzy confidence set (see FIGS. 8A and 8B) used in the defuzzification procedure.
Figure 10A:
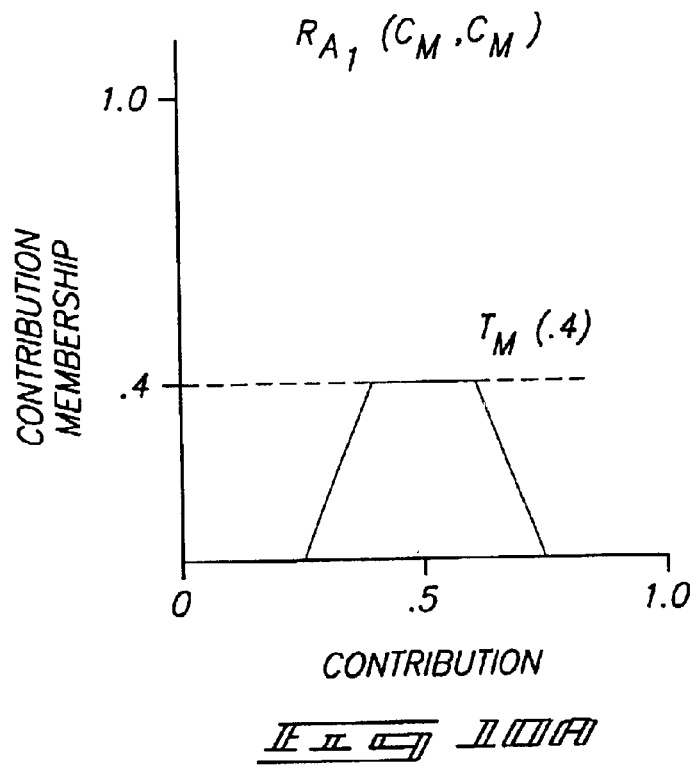
FIGS. 10A and 10B are explanatory views showing temperature contribution coefficient fuzzy sets for the first sensor range for temperature steps from the first sensor.
Figure 10B:
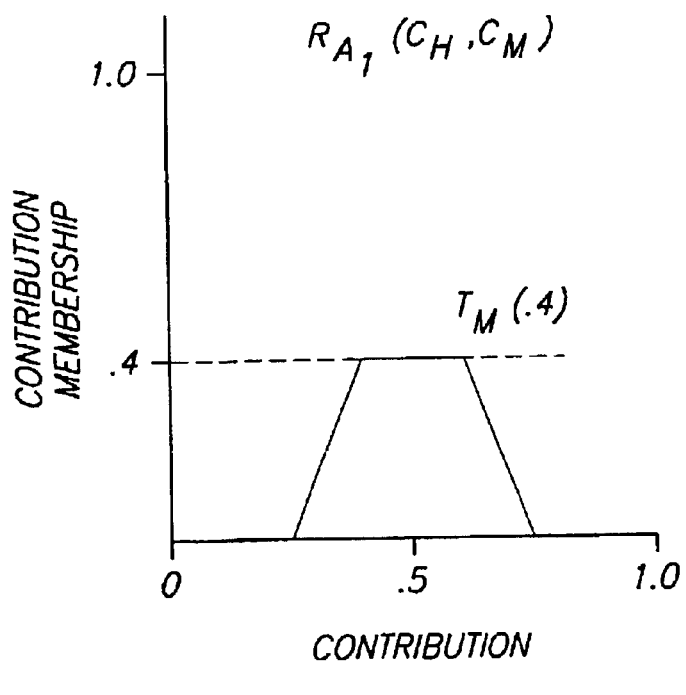
Figure 11A:
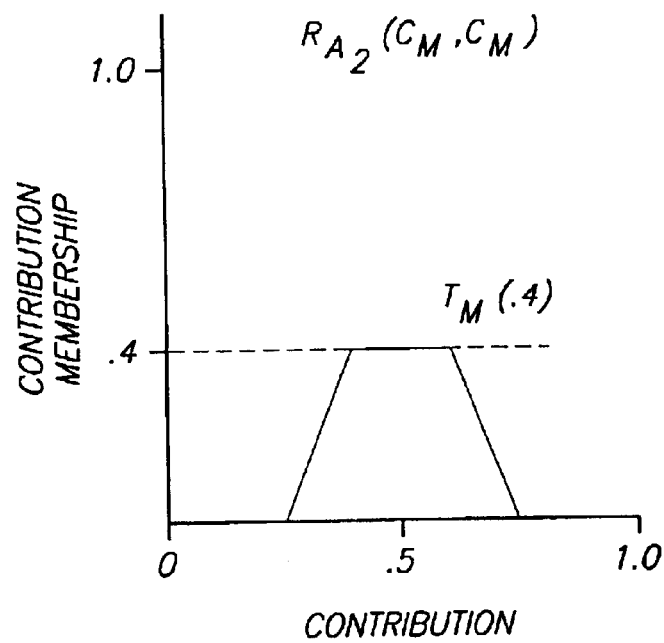
FIGS. 11 and 11B are explanatory views showing temperature contribution coefficient fuzzy sets for the second sensor.
Figure 11B:
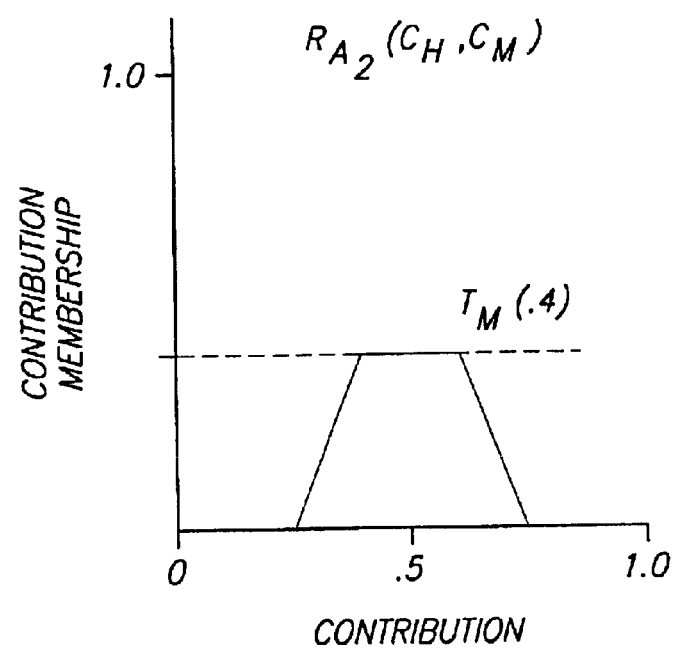

FIG. 9 illustrates the full fuzzy observation confidence set based on each of the fuzzy rules $R_C$ (x, y), contribution from the rule based confidence set defined in FIG. 5A; i.e., $\Sigma_j \Sigma_k R_C$ (j, k). This set must be defuzzified, reduced to a scalar, so that it can be issued to the controller 25 as the observed confidence level.

As shown in FIG. 9, defuzzification comprises the reduction of a set into a scalar confidence level based upon multiple sensor confidence levels' contributions. According to Equation 1 depicted below:

$$C = \frac{\int_0^1 t \sum_j \sum_k R_c(j,k) dt}{\int_0^1 \sum_j \sum_k R_c(j,k) dt} \quad \text{Equation 1}$$

$$C = \frac{\int_0^1 t(R_c(C_M, C_M) + R_c(C_H, C_M)) dt}{\int_0^1 (R_c(C_M, C_M) + R_c(C_H, C_M)) dt} = 0.371$$

Where j,k∈[$C_L$,$C_M$,$C_H$]

Figure 12A:
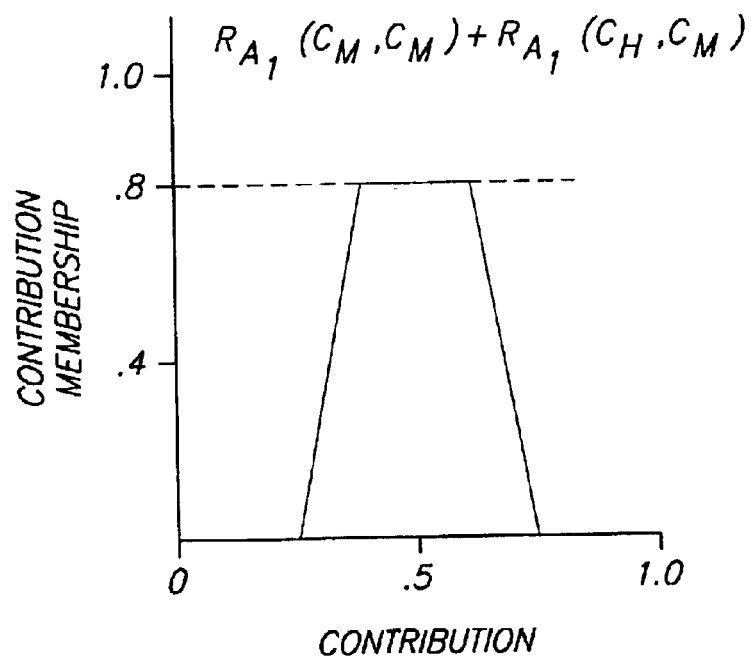
FIG. 12A is an explanatory view showing the defuzzification of fuzzy contribution sets (FIGS. 10A and 10B) used in the defuzzification procedure.
Figure 12B:
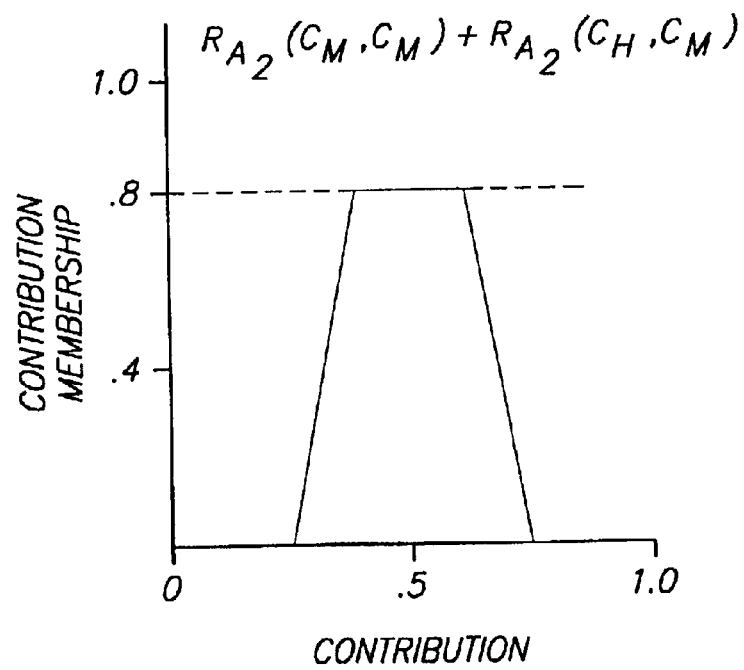
FIG. 12B is an explanatory view showing the defuzzification of fuzzy contribution sets (FIGS. 11A and 11B used in the defuzzification procedure.

Now that the observer has calculated a confidence level for the joint measurement, the observed temperature needs to be calculated. Again using the confidence sets from FIGS. 6 and 7 and the max-product fuzzy inference, the contribution sets from rules $R_{A_1}$($C_M$,$C_M$), $R_{A_1}$($C_H$,$C_M$), $R_{A2}$($C_M$,$C_M$) and $R_{A2}$($C_H$,$C_M$) (see fuzzy rule base in FIG. 5B), are FIGS. 10A, 10B, 11A and 11B, respectively. The full contribution set for sensor #1, $A_1$, is shown in FIG. 12A. Likewise, the full contribution set for sensor #2, $A_2$, is shown in FIG. 12B. As was with the confidence sets, each set must be defuzzified into a scalar contribution term. Such a defuzzification can be carried out using Equations 2 and 3, illustrated below:

$$A_1 = \frac{\int_0^1 t \left\{ \sum_j \sum_k R_{A_1}(j,k) \right\} dt}{\int_0^1 \left\{ \sum_j \sum_k R_{A_1}(j,k) \right\} dt} \quad \text{Equation 2}$$

$$= \frac{\int_0^1 t\{R_{A_1}(C_M, C_M) + R_{A_1},(C_H, C_M)\} dt}{\int_0^1 \{R_{A_1}(C_M, C_M) + R_{A_1},(C_H, C_M)\} dt}$$

$$= .5$$

Where j,k∈[$C_L$,$C_M$,$C_H$]

$$A_2 = \frac{\int_0^1 t \left\{ \sum_j \sum_k R_{A_2},(j,k) \right\} dt}{\int_0^1 \left\{ \sum_j \sum_k R_{A_1}(j,k) \right\} dt} \quad \text{Equation 3}$$

$$= \frac{\int_0^1 t\{R_{A_2},(C_M, C_M) + R_{A_2},(C_H, C_M)\} dt}{\int_0^1 \{R_{A_2},(C_M, C_M) + R_{A_2},(C_H, C_M)\} dt}$$

$$= .5$$

Where j,k∈[$C_L$,$C_M$,$C_H$]

Next the contribution co-efficiency can be used to combine the two measured temperatures into an observed temperature using Equation 4.

$$\begin{aligned} A_{observed} &= A_1 T_1 + A_2 T_2 \\ &= .5(1200) + .5(1180) \\ &= 1190 \end{aligned} \quad \text{Equation 4}$$

This concludes the exemplary example of the fuzzy observer. Such an observer can be used within a fuzzy control system that will exploit both the observed temperature as well as the confidence of that temperature. Traditional control systems are not well suited for exploiting the confidence information obtained along with the observed temperature.

Figure 13:
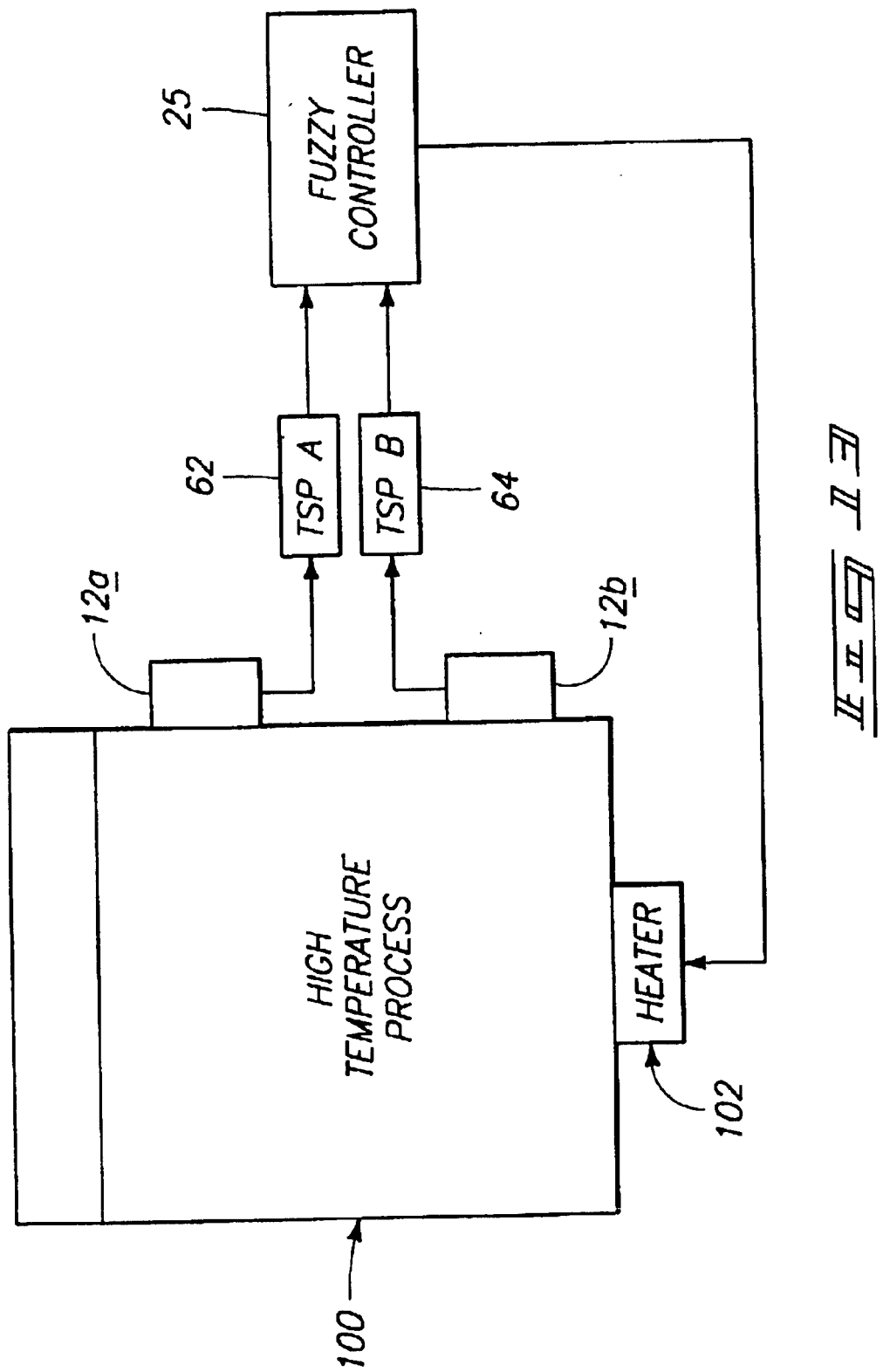
FIG. 13 is a block diagram showing an embodiment of a fuzzy controller implementation as used on a high-temperature process pursuant to the implementation depicted in FIGS. 14A–C.

FIG. 13 illustrates an exemplary fuzzy control system. This system is made up of: two sensor packages 62 and 64; two sensor heads 12A and 12B, one heater 102, one high-temperature process 100, and a fuzzy controller 25. The control concept is to control two temperatures, 12A and 12B, within the process through the use of a single heater 100.

Figure 14A:
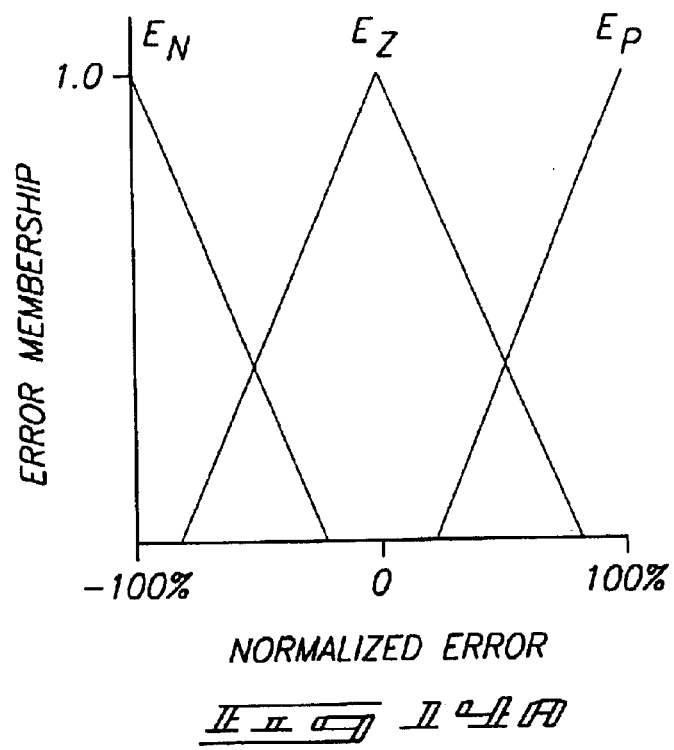
FIG. 14A is an explanatory view showing examples of membership sets for detected temperature errors when implementing a fuzzy controller.

FIG. 14A illustrates an example of normalized error membership sets. More particularly, FIG. 14A illustrates membership sets for error classes negative error ($E_N$), zero error ($E_Z$), and positive error ($E_P$). Such membership classes are plotted for membership values ranging from zero to one against a normalized error, ranging from −100 to 100.

Figure 14B:
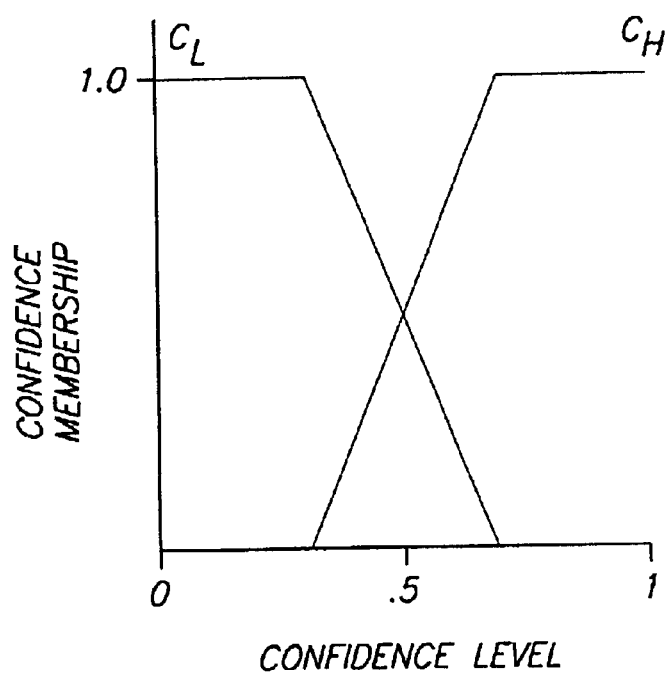
FIG. 14B is an explanatory view showing membership sets for low and high confidence levels when implementing a fuzzy controller.
Figure 11D:
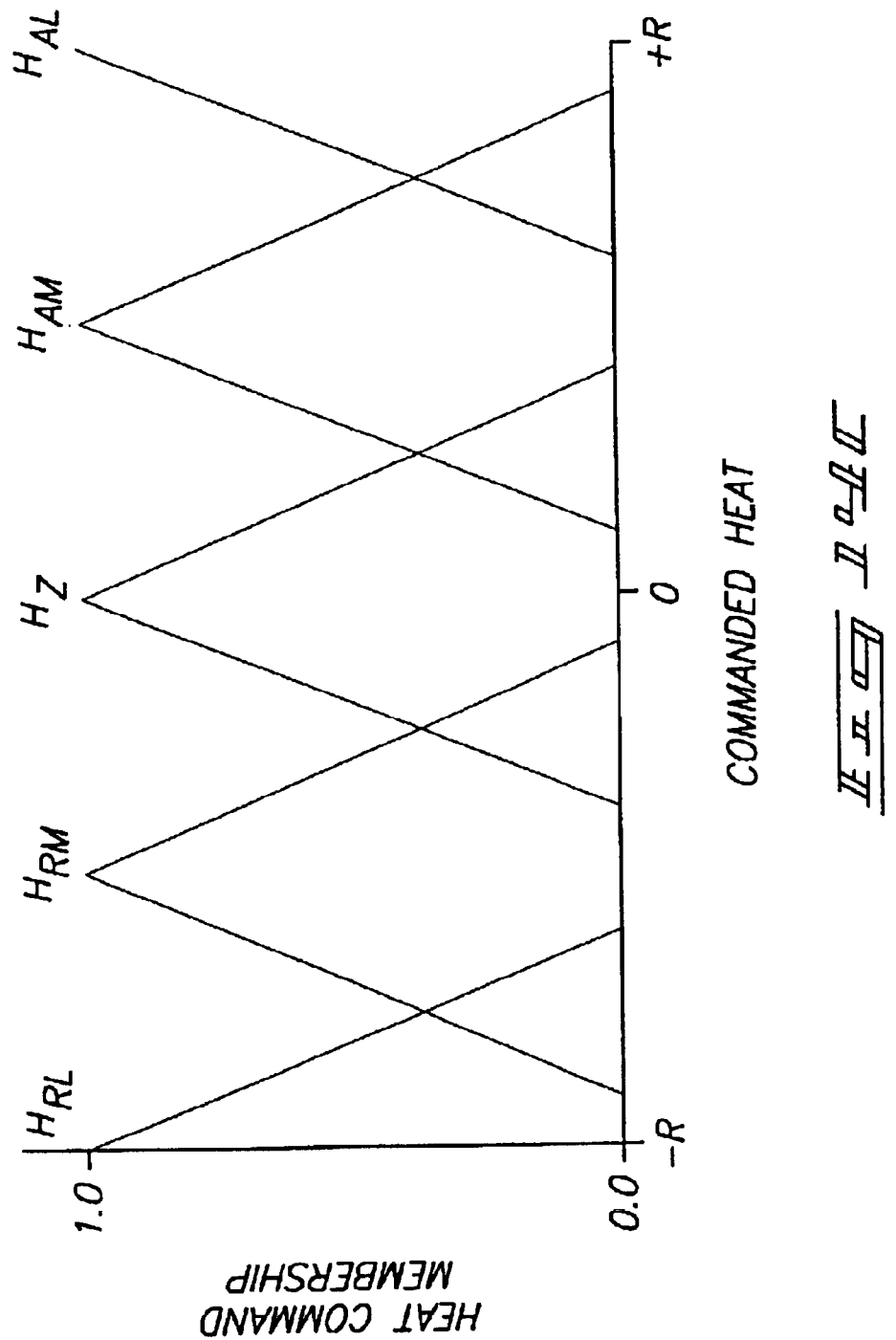

FIG. 14B illustrates an example of temperature confidence level membership set for the fuzzy controller. Note, these sets are different from the confidence sets used within the fuzzy observer. Moreover, FIG. 14B illustrates membership sets for two classes: low confidence ($C_L$) and high confidence ($C_H$). Such membership classes are plotted for membership values ranging from zero to one against a confidence level zero to one.

FIG. 14C illustrates an example of heat command membership sets. Moreover, these heat command sets cover five typical commands: remove a large amount of heat ($H_{RL}$), remove a medium amount of heat ($H_{RM}$), make no change in heating ($H_Z$), add a medium amount of heat ($H_{AM}$), and add a large amount of heat ($H_{AL}$). Such membership classes are plotted for membership values ranging from zero to one against a heat control command ranging from −R to R. R is indicated as representing the maximum range allowed for a control command step provided in either the positive or negative direction for a fixed heater 102.

For purposes of equations 1–11, the following notations are utilized. First consider the following definitions:

Notations:

$H_{R_X}$=remove heat x $\epsilon$=[medium, large]
$H_Z$=zero heat change
$H_{A_X}$=add heat
$C_L$=low confidence
$C_H$=high confidence
$E_N$=negative error
$E_Z$=zero error
$E_P$=positive error
$T_{S_1}$=temperature set point for sensor #1
$T_{S_2}$=temperature set point for sensor #2
$T_1$=temperature measured from sensor #1
$C_1$=confidence level for sensor #1
$T_2$=temperature measured from sensor #2
$C_2$=confidence level for sensor #2
$T_{E_1}$=percent error for TS1
$T_{E_2}$=percent error for TS2
R=is one max range allowed for a step in either the positive or negative fixed heater control
$\Delta T$=is the update time/sample time
H=is the heater set point
$\Delta H$=is the change in the set point Using these definitions the fuzzy controller can be defined as follows. Normalized temperature errors can be calculated as follows:

$$T_{E_1} = \frac{T_1 - T_{S_1}}{T_{S_1}} \quad T_{E_2} = \frac{T_2 - T_{S_2}}{T_{S_2}}$$

Next these errors are converted into their fuzzy error sets as was done earlier in the observer.

$$T_{E_1}, T_{E_2} \xrightarrow{\text{Fuzzy memberships}} E_{N_1}, E_{Z_1}, E_{P_1}, E_{N_2}, E_{Z_2}, E_{P_2}$$

Likewise, the same process is used for the confidence inputs.

$$C_1, C_2 \xrightarrow{\text{Fuzzy memberships}} C_{L_1}, C_{H_1}, C_{L_2}, C_{H_2}$$

These membership sets can then be used to obtain the fuzzy control rule, as before using max-product. This control rule can likewise be defuzzified using the following equation to obtain the heater control's update, $\Delta H$.

$$\Delta H = \frac{\int_0^1 t \sum_i \sum_j \sum_k \sum_l R_H(i,j,k,l) dt}{\int_0^1 \sum_i \sum_j \sum_k \sum_l R_H(i,j,k,l) dt}$$

Where $i \in [E_{N_1}, E_{Z_1}, E_{P_1}]$
$j \in [E_{N_2}, E_{Z_2}, E_{P_2}]$
$k \in [C_{L_1}, C_{H_1}]$
$l \in [C_{L_2}, C_{H_2}]$ Thus the heater control can be updated every $\Delta T$ second as follows:

$$H = H + \Delta H.$$

As an overview FIG. 13 illustrates one exemplary implementation of a fixed heater control system corresponding to the embodiment depicted in FIG. 3. More particularly, fuzzy controller 25 receives signals from temperature sensor packages (TSP A and TSP B) 62 and 64 and sends control commands corresponding to decisions made by fuzzy controller 25 represented by FIG. 13. Such control signals are received by a heater 102. Heater 102 delivers heat accordingly, based upon the received control commands of FIG. 15 to a high-temperature process 100. Sensor #1 of FIG. 15 corresponds with an output signal from sensor head 12A and TSP A (#62), and sensor #2 corresponds with an output signal from sensor head 12B and TSP B (#64). According to one implementation, the high-temperature process 100 of FIG. 13 corresponds with furnace 19 (of FIG. 3).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A measuring instrument, comprising:
    a first temperature sensor configured to generate a signal indicative of temperature of a medium;
    a second temperature sensor configured to generate a signal indicative of the temperature of the medium, the first and second temperature sensors disposed in a heat transfer relation; and
    circuitry including a fuzzy control apparatus configured to receive and compare the first temperature sensor signal with the second temperature sensor signal to detect proper operation of the first temperature sensor, the fuzzy control apparatus comprising:
        an input for receiving a first sensed temperature signal from the first temperature sensor and a second sensed temperature signal from the second temperature sensor;
        a storage circuit for storing a plurality of fuzzy control rules; and
        a fuzzy control execution circuit coupled to the input and the storage circuit, and operative to determine a control error between the first and second sensed temperature signals; and
    wherein both the first and the second temperature sensors use different physical techniques to measure temperature readings of the medium.

* * * * *